US008804980B2

(12) United States Patent
Sugiyama et al.

(10) Patent No.: US 8,804,980 B2
(45) Date of Patent: Aug. 12, 2014

(54) SIGNAL PROCESSING METHOD AND APPARATUS, AND RECORDING MEDIUM IN WHICH A SIGNAL PROCESSING PROGRAM IS RECORDED

(75) Inventors: Akihiko Sugiyama, Tokyo (JP); Masanori Kato, Tokyo (JP)

(73) Assignee: NEC Corporation, Tokyo (JP)

( * ) Notice: Subject to any disclaimer, the term of this patent is extended or adjusted under 35 U.S.C. 154(b) by 265 days.

(21) Appl. No.: 13/273,322

(22) Filed: Oct. 14, 2011

(65) Prior Publication Data

US 2012/0033828 A1 Feb. 9, 2012

Related U.S. Application Data

(63) Continuation of application No. 11/850,175, filed on Sep. 5, 2007, now abandoned.

(30) Foreign Application Priority Data

Mar. 6, 2007 (JP) ................................ 2007-055146

(51) Int. Cl.
*H04B 15/00* (2006.01)

(52) U.S. Cl.
USPC ......................... 381/94.3; 381/94.1; 381/94.2

(58) Field of Classification Search
USPC ................ 381/94.1–94.4, 94.7; 704/226, 233
See application file for complete search history.

(56) References Cited

U.S. PATENT DOCUMENTS

| | | | | |
|---|---|---|---|---|
| 7,096,182 | B2 | 8/2006 | Chandran et al. | |
| 7,224,810 | B2 | 5/2007 | Brown | |
| 2003/0128851 | A1 * | 7/2003 | Furuta | 381/94.2 |
| 2003/0144034 | A1 | 7/2003 | Hack et al. | |
| 2007/0182595 | A1 | 8/2007 | Ghasabian | |
| 2008/0075300 | A1 * | 3/2008 | Isaka | 381/94.2 |

FOREIGN PATENT DOCUMENTS

| | | |
|---|---|---|
| JP | 7-248793 A | 9/1995 |
| JP | 11-102197 A | 4/1999 |

(Continued)

OTHER PUBLICATIONS

Kato, Masanori et al.; "A Low-Complexity Noise Suppressor With Nonuniform Subbands and a Frequency-Domain Highpass Filter"; Media and Information Research Labs., NEC Corporation, Kawasaki 211-8666, Japan. ICASSP 2006.

(Continued)

*Primary Examiner* — Disler Paul
(74) *Attorney, Agent, or Firm* — Dickstein Shapiro LLP

(57) ABSTRACT

A signal processing method for converting a signal received via a transmission path or read from a storage medium into a first audible signal, and suppressing a noise other than a desired signal contained in the first audible signal based on predetermined audio quality adjustment information, comprising steps of: in suppressing a noise other than a desired signal contained in the first audible signal to generate an enhanced signal, receiving audio quality adjustment information for adjusting audio quality; and adjusting audio quality of the enhanced signal using the audio quality adjustment information.

2 Claims, 22 Drawing Sheets

(56) References Cited

FOREIGN PATENT DOCUMENTS

| | | | |
|---|---|---|---|
| JP | 2002-204175 | A | 7/2002 |
| JP | 2005-257805 | A | 9/2005 |
| JP | 2005-328320 | A | 11/2005 |
| JP | 2006-211255 | A | 8/2006 |
| JP | 2006-222838 | A | 8/2006 |
| JP | 2006-270474 | A | 10/2006 |

OTHER PUBLICATIONS

Yariv Ephraim and David Malah; "Speech Enhancement Using a Minimum Mean-Square Error Short-Time Spectral Amplitude Estimator"; IEEE Transactions on Acoustics, Speech, and Signal Processing, vol. ASSP-32, No. 6, Dec. 1984, pp. 1109-1121.

Encyclopedia of Mathematics, published by Iwanami Shoten, 1985, p. 374.

Jae S. Lim and Alan V. Oppenheim; "Enhancement and Bandwidth Compression of Noisy Speech"; Proceedings of the IEEE, vol. 67, No. 12, Dec. 1979, pp. 1586-1604.

Steven F. Boll; "Suppression of Acoustic Noise in Speech Using Spectral Subtraction"; IEEE Transactions on Acoustics, Speech, and Signal Processing, vol. ASSP-27, No. 2, Apr. 1979, pp. 113-120.

* cited by examiner

SIGNAL PROCESSING METHOD AND APPARATUS, AND RECORDING MEDIUM IN WHICH A SIGNAL PROCESSING PROGRAM IS RECORDED

CROSS REFERENCE TO RELATED APPLICATIONS

This application is a continuation of application Ser. No. 11/850,175, filed Sep. 5, 2007, and which claims priority to Japanese Patent Application No. 2007-55146 filed on Mar. 6, 2007, the disclosure of each of which is incorporated herein by reference.

BACKGROUND ART

The present invention relates to method, apparatus and program for signal processing that realizes a function of suppressing a noise superposed over a desired voice signal, and more particularly to method, apparatus and program for signal processing for performing suppression at a position close to a reproducing device such as a speaker.

Conventionally, a noise suppressor (noise suppression system) is a system for suppressing a noise superposed over a desired voice signal, and in general, it operates to suppress a noise mixed in a desired voice signal by estimating a power spectrum of a noise component using an input signal converted into a frequency domain, and subtracting the estimated power spectrum from the input signal. By estimating the power spectrum of a noise component in a continuous manner, it can be applied to suppression of a non-stationary noise. One noise suppressor is of a scheme described in Patent Document 1 (JP-P2002-204175A), for example.

Another noise suppressor as an implementation having reduced computational complexity is of a scheme described in Non-Patent Document 1 (Proceedings of ICASSP, Vol. I, pp. 473-476, May, 2006.

These schemes have the same basic operation. In other words, an input signal is converted into a frequency domain with linear transform; an amplitude component is extracted; and a suppression coefficient is calculated for each frequency component. Then, a product of the suppression coefficient and amplitude for each frequency component and a phase of the frequency component are combined and inversely converted to obtain a noise-suppressed output. At that time, the suppression coefficient has a value between zero and one, where a suppression coefficient of zero represents complete suppression and results in a zero-output, and a suppression coefficient of one causes the input to be output as it is without suppression.

The most common application for the noise suppressor is in cell phone communication, as shown in FIG. 29. A transmitter terminal 7000 is comprised of a noise suppressor 710, an encoder 720, and a transmitter 730. The noise suppressor 710 is supplied with an input signal via an input terminal 700. In a common cell phone, the input terminal 700 is supplied with a signal picked up by a microphone (microphone signal). The microphone signal is composed of a voice itself and a background noise, and the noise suppressor 710 suppresses only the background noise while keeping the voice as intact as possible, and transmits the noise-suppressed voice to the encoder 720. The encoder 720 encodes the noise-suppressed voice supplied from the noise suppressor 710 based on an encoding scheme such as CELP. The encoded information is transferred to the transmitter 730 and subjected to modulation, amplification, etc., and thereafter is supplied to a transmission path 800. That is, the transmitter terminal 7000 applies a noise suppressor, then performs processing such as voice encoding, and sends the signal to the transmission path.

A receiver terminal 9000 is comprised of a receiver 930 and a decoder 920. The receiver 930 demodulates a signal received from the transmission path 800, digitizes it, and then transfers it to the decoder 920. The decoder 920 decodes the signal received from the receiver 930, and transfers an audible signal to an output terminal 900. The signal obtained at the output terminal 900 is supplied to a speaker for reproduction as an acoustic signal.

In noise suppression with one input, generally there is a tradeoff between a residual noise and output distortion, and a low residual noise is not concomitant with low output distortion. Moreover, the most comfortable combination of residual noise and output distortion is different from user to user, so that it is impossible to preset audio quality that satisfies a plurality of users. Accordingly, noise suppression is sometimes done while avoiding an increase of output distortion due to excessive suppression and tolerating a certain degree of residual noise. Moreover, to improve encoding efficiency in a signal segment containing no voice, the encoder 720 in the transmitter terminal 7000 sometimes has a discontinuous transmission (DTX) function, by which only the background noise level is encoded with a smaller amount of information. In this case, the decoder 920 in the receiver terminal 9000 has a function of generating a noise according to the transmitted background noise level (comfort noise) (CNG).

However, the conventional configuration described with reference to FIG. 29 does not allow a user to operate the noise suppressor 710 because it is placed temporally and spatially remote from the user. Accordingly, when a high residual noise is present due to the noise suppressor 710 or the function of the noise suppressor 710 is disabled in the configuration disclosed in FIG. 29, there arises a problem that a user of the receiver terminal 9000 should catch a low-quality voice having a high background noise. Moreover, there is another problem that some users may hear an objectionable noise due to CNG because too high a level of CNG is made by the decoder 920.

SUMMARY OF THE INVENTION

The present invention is made to solve the above-mentioned problems.

The objective of the present invention is to provide method, apparatus and program for signal processing having a function for suppressing a noise contained in a signal generated by noise suppression processing having an inadequate function, and a function for suppressing a CNG noise.

Moreover, another objective of the present invention is to provide method, apparatus and program for signal processing having a function for allowing a user to adjust audio quality according to the user's preferences.

The objective of the present invention is achieved by a signal processing method for converting a signal received via a transmission path or read from a storage medium into a first audible signal, and suppressing a noise other than a desired signal contained in the first audible signal based on predetermined audio quality adjustment information, comprising steps of: in suppressing a noise other than a desired signal contained in the first audible signal to generate an enhanced signal, receiving audio quality adjustment information for adjusting audio quality; and adjusting audio quality of the enhanced signal using the audio quality adjustment information.

Moreover, the objective of the present invention is achieved by a signal processing apparatus comprising: a receiver for converting a signal received via a transmission path or read from a storage medium into a first audible signal; and a noise suppressor for suppressing a noise other than a desired signal contained in the first audible signal using predetermined audio quality adjustment information, wherein, in suppressing a noise other than a desired signal contained in the first audible signal to generate an enhanced signal, the noise suppressor receives audio quality adjustment information for adjusting audio quality, and adjusts audio quality of the enhanced signal using the audio quality adjustment information.

Furthermore, the objective of the present invention is achieved by a signal processing program causing a computer to execute processing of: converting a signal received via a transmission path or read from a storage medium into a first audible signal; and, in suppressing a noise other than a desired signal contained in the first audible signal to generate an enhanced signal, receiving audio quality adjustment information for adjusting audio quality, and adjusting audio quality of the enhanced signal using the audio quality adjustment information.

EXEMPLARY EMBODIMENTS

Figure 1:
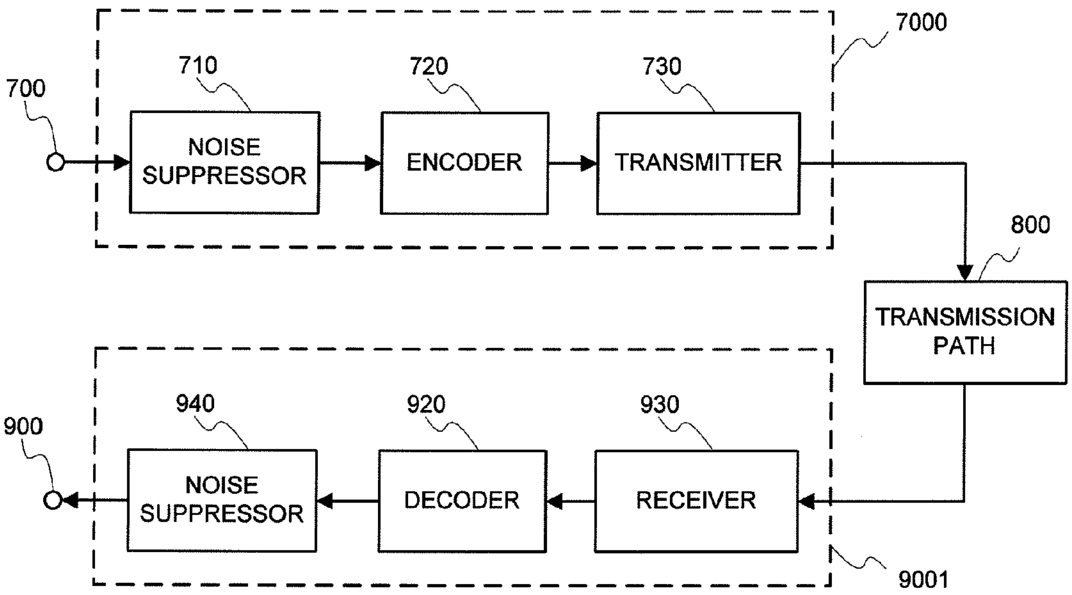
FIG. 1 is a block diagram showing the best mode for carrying out the present invention.

FIG. 1 is a block diagram showing the best mode for carrying out the present invention. FIG. 1 is similar to a prior art of FIG. 29 except as a receiver terminal 9001. The operation will be described in detail hereinbelow focusing upon the difference.

Figure 29:
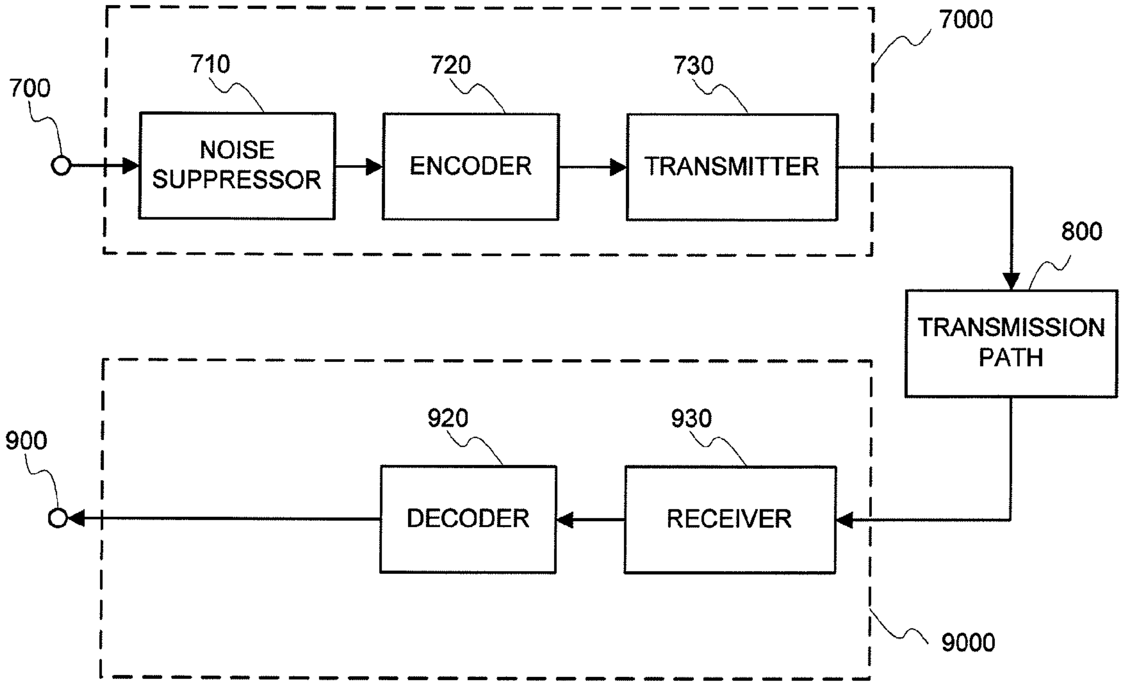
FIG. 29 is a block diagram showing an example of application of noise suppression in a communication system using cell phones.

In FIG. 1, a noise suppressor 940 is provided as post-processing of the decoder 920 in FIG. 29. The noise suppressor 940 receives a decoded signal from the decoder 920, and suppresses a residual noise and a noise added by CNG in the decoder 920. The noise-suppressed signal is supplied to the output terminal 900.

Figure 2:
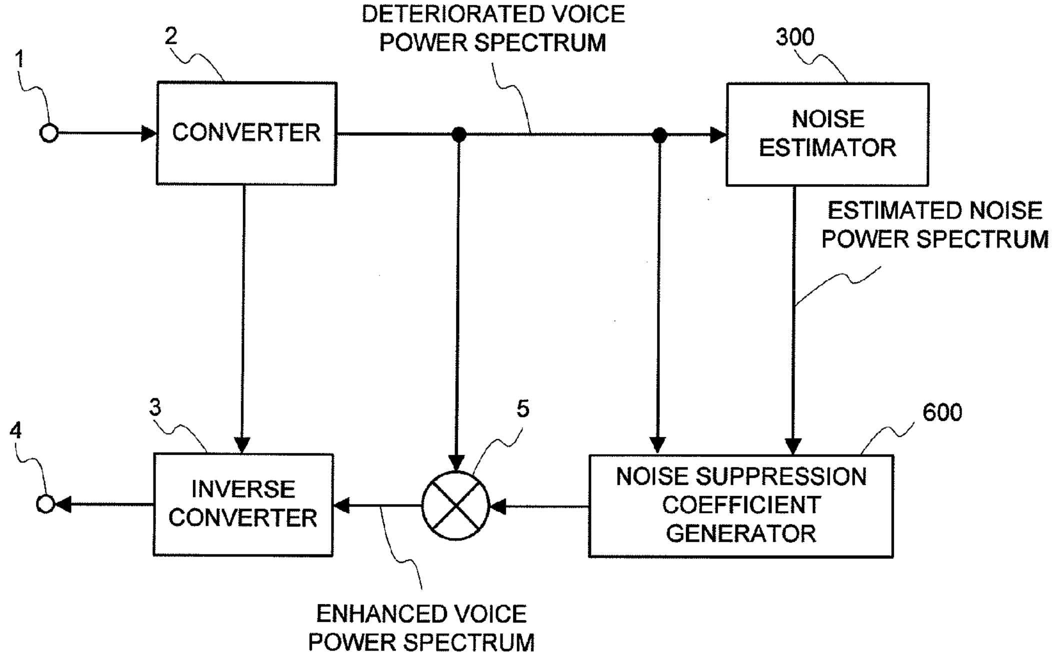
FIG. 2 is a block diagram showing a configuration of a noise suppressor included in the best mode for carrying out the present invention.

FIG. 2 shows a configuration of the noise suppressors 710 and 940. Since these noise suppressors can have the same configuration, the following description will be made with reference to the noise suppressor 940. A decoded signal supplied from the decoder 920 to the noise suppressor 940 is supplied to the input terminal 1 in FIG. 2 as a sequence of sampled values of a deteriorated voice signal (a signal having desired voice signal and noise mixed).

The deteriorated voice signal sample undergoes conversion such as Fourier transform at a converter 2, and is decomposed into a plurality of frequency components, whose power spectrum obtained using the amplitude value is multiplexed, and is supplied to a noise estimator 300, a noise suppression coefficient generator 600, and a multiplier 5. A phase is transmitted to an inverse converter 3. The noise estimator 300 uses the power spectrum of the deteriorated voice to estimate a power spectrum of the noise contained therein for each of the plurality of frequency components, and transmits it to the noise suppression coefficient generator 600. An example of the noise estimation schemes involves weighting the deteriorated voice with a signal-to-noise ratio in the past to obtain a noise component, detail of which is described in Patent Document 1. The number of the estimated noise power spectra is equal to the number of the frequency components. The noise suppression coefficient generator 600 uses the supplied deteriorated voice power spectrum and estimated noise power spectrum to generate and output a suppression coefficient for multiplication with the deteriorated voice to obtain an enhanced voice in which the noise is suppressed. Since the suppression coefficient is obtained for each frequency component, the output from the suppression coefficient generator 600 is a number of suppression coefficients, which number is equal to the number of frequency components. A widely used example of the noise suppression coefficient generation techniques is a minimum average square short-term spectrum amplitude method in which the average square power of an enhanced voice is minimized, detail of which is described in Patent Document 1. The suppression coefficient generated per frequency is supplied to the multiplier 5. The multiplier 5 multiplies the deteriorated voice supplied from the converter 2 with the suppression coefficient supplied from the noise suppression coefficient generator 600 for each frequency, and transmits the product to the inverse converter 3 as a power spectrum of an enhanced voice. The inverse converter 3 performs inverse conversion in which the phase of the enhanced voice power spectrum supplied from the multiplier 5 is in phase with that of the deteriorated voice supplied from the converter 2, to obtain an enhanced voice signal sample and supplies it to the output terminal 4. While the preceding description has been made on a case in which the power spectrum is employed in the processing, it is generally known that the amplitude value, which corresponds to a square root of the power, may be used instead.

Figure 3:
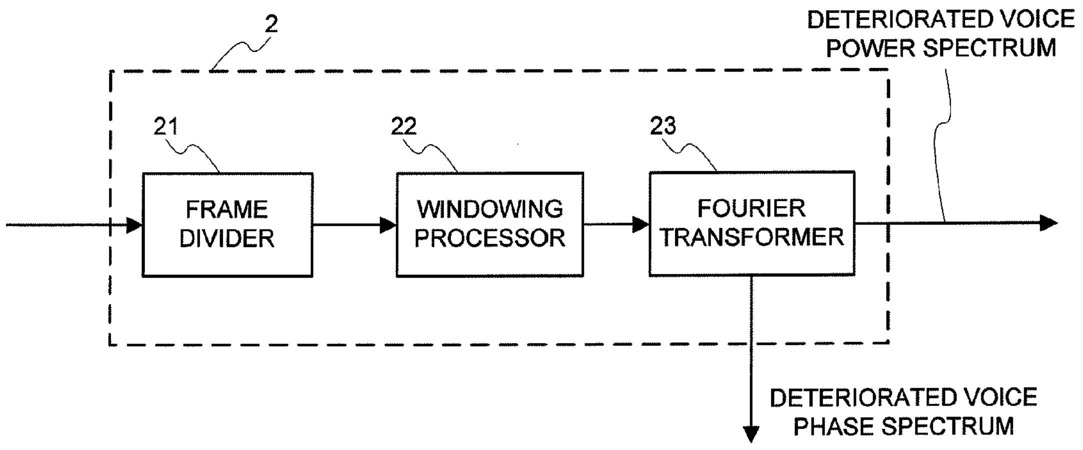
FIG. 3 is a block diagram showing a configuration of a converter included in FIG. 2.

FIG. 3 is a block diagram showing a configuration of the converter 2. The converter 2 is comprised of a frame divider 21, a windowing processor 22, and a Fourier transformer 23. The deteriorated voice signal sample is supplied to the frame divider 21, and divided into frames each having K/2 samples, where K is an even number. The deteriorated voice signal sample divided into frames is supplied to the windowing processor 22, and is multiplied with a window function w(t). A signal $y_n$(t)bar obtained by windowing an input signal $y_n$(t) (t=0, 1, . . . , K/2−1) with w(t) in an n-th frame is given by the following equation:

$$\bar{y}_n(t)=w(t)y_n(t) \quad \text{[Equation 1]}$$

Moreover, it is a common practice to perform windowing on two consecutive and partially overlapping frames. Assuming that the length of overlap is 50% of the frame length, $y_n$(t) bar (t=0, 1, . . . , K−1) obtained for t=0, 1, . . . , K/2−1 according to:

$$\bar{y}_n(t)=w(t)y_{n-1}(t+K/2)$$

$$\bar{y}_n(t+K/2)=w(t+K/2)y_n(t) \quad \text{[Equation 2]}$$

is an output of the windowing processor 22. A horizontally symmetric window function is used for a real signal. Moreover, the window function is designed so that an input signal for a suppression coefficient of one becomes an output signal equal to the input signal aside from a computational error. This means that w(t)+w(t+K/2)=1 stands.

The following description will be made with reference to an example of windowing with 50% of two consecutive frames overlapped. For w(t), a hanning window given by the following equation may be employed, for example:

$$w(t)=\begin{cases}0.5+0.5\cos\left(\dfrac{\pi(t-K/2)}{K/2}\right), & 0\le t<K\\ 0, & \text{otherwise}\end{cases} \quad \text{[Equation 3]}$$

In addition, there are known a variety of window functions, including a hamming window, a Kaiser window, a Blackman window, and the like. The windowed output $y_n$(t) bar is supplied to the Fourier transformer 23, and converted into a deteriorated voice spectrum $Y_n$(k). The deteriorated voice spectrum $Y_n$(k) is separated into a phase and an amplitude, and the deteriorated voice phase spectrum arg$Y_n$(k) is supplied to the inverse converter 3 and the deteriorated voice power spectrum □$Y_n$(k)□$^2$ is supplied to the multiplier 5, noise estimator 300 and noise suppression coefficient generator 600.

Figure 4:
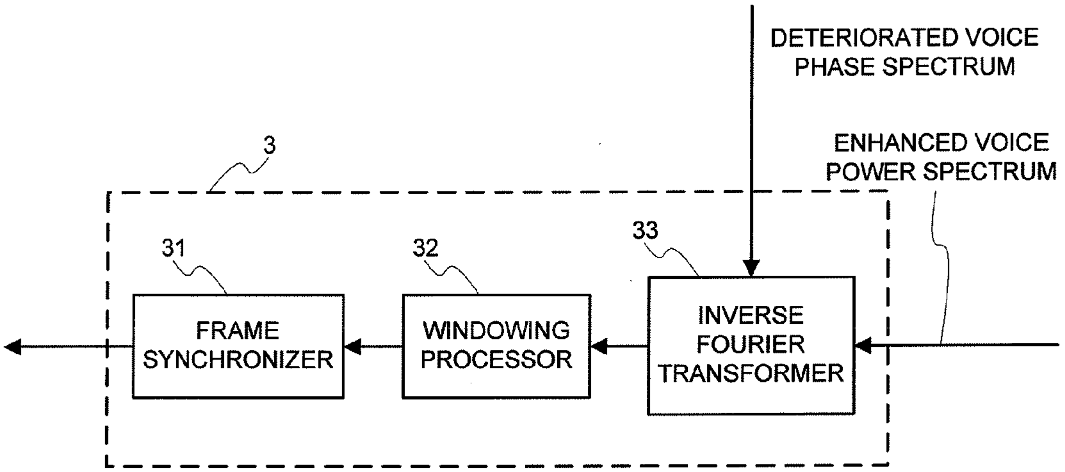
FIG. 4 is a block diagram showing a configuration of an inverse converter included in FIG. 2.

FIG. 4 is a block diagram showing a configuration of the inverse converter 3. The inverse converter 3 is comprised of an inverse Fourier transformer 33, a windowing processor 32, and a frame synchronizer 31. The inverse Fourier transformer 33 multiplies an enhanced voice amplitude spectrum □$X_n$(k)□bar obtained using an enhanced voice power spectrum □$X_n$(k)□$^2$ bar supplied from the multiplier 5, with the deteriorated voice phase spectrum arg$Y_n$(k) supplied from the converter 2 to calculate an enhanced voice $X_n$(k)bar. That is, $$\bar{X}_n(k)=|\bar{X}_n(k)|\cdot argY_n(k) \quad \text{[Equation 4]}$$

is executed.

The resulting enhanced voice $X_n$(k)bar is subjected to inverse Fourier transform to obtain a series of time-domain sampled values $x_n$(t) bar (t=0, 1, . . . , K−1) comprised of K samples per frame, and supplies it to the windowing processor 32 for multiplication with a window function w(t). A signal $x_n$(t)bar windowed with w(t) for an input signal $x_n$(t) (t=0, 1, . . . , K/2−1) in an n-th frame is given by the following equation.

$$\bar{x}_n(t)=w(t)x_n(t) \quad \text{[Equation 5]}$$

Moreover, it is a common practice to perform windowing on two consecutive and partially overlapping frames. Assuming that the length of overlap is 50% of the frame length, $x_n$(t) bar (t=0, 1, . . . , K−1) obtained for t=0, 1, . . . , K/2−1 according to:

$$\bar{x}_n(t)=w(t)x_{n-1}(t+K/2)$$

$$\bar{x}_n(t+K/2)=w(t+K/2)x_n(t) \quad \text{[Equation 6]}$$

is an output of the windowing processor 32, and is transferred to the frame synchronizer 31. The frame synchronizer 31 takes up K/2 samples each time from two adjacent frames of $x_n$(t) bar and makes them overlap with each other to obtain an enhanced voice $x_b$(t)hat according to:

$$\hat{x}_n(t)=\bar{x}_{n-1}(t+K/2)+\bar{x}_n(t) \quad \text{[Equation 7]}$$

The resulting enhanced voice $x_n$(t)hat (t=0, 1, . . . , K−1) is an output of the frame synchronizer 31, and is transferred to the output terminal 4. While in FIGS. 3 and 4, an explanation has been made with reference to Fourier transform that is applied at the converter and inverse converter, other transform such as cosine transform, Hadamard transform, Haar transform, wavelet transform, etc. may be employed in place of Fourier transform as well known in the art.

Figure 5:
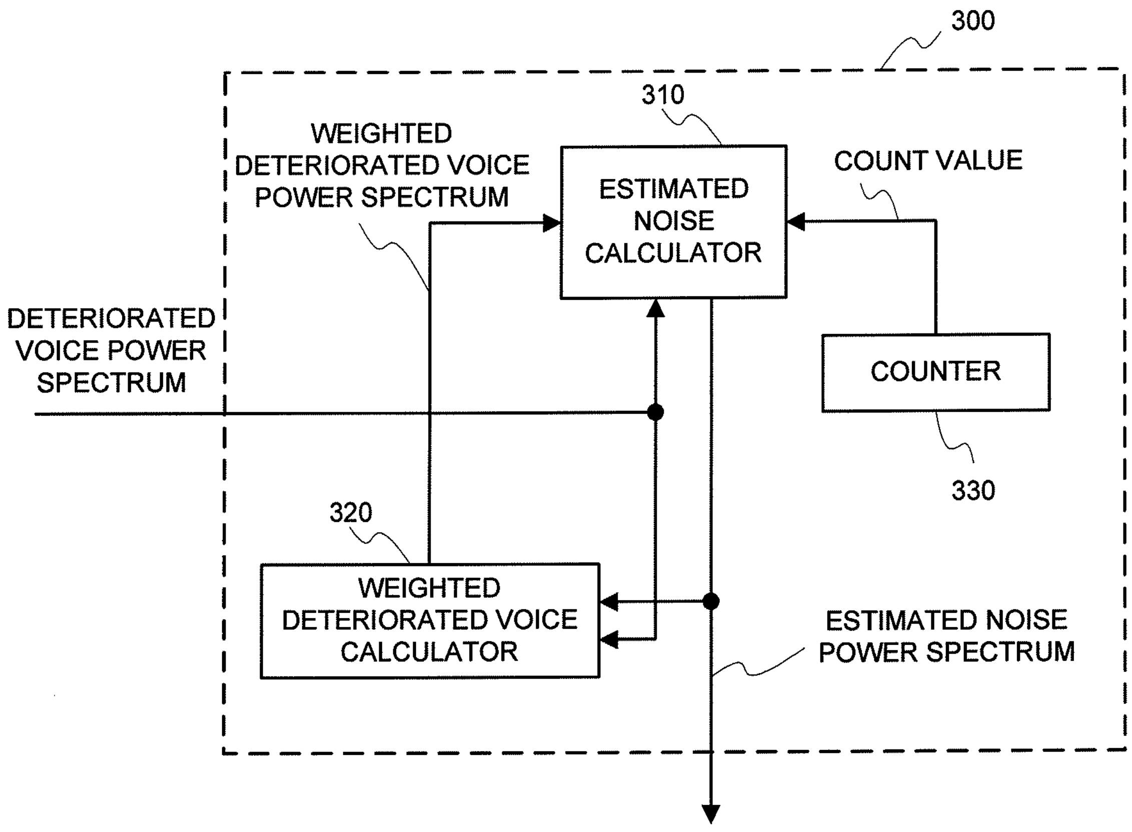
FIG. 5 is a block diagram showing a configuration of a noise estimator included in FIG. 2.

FIG. 5 is a block diagram showing a configuration of the noise estimator 300 in FIG. 2. The noise estimator 300 is comprised of an estimated noise calculator 310, a weighted deteriorated voice calculator 320, and a counter 330. The deteriorated voice power spectrum supplied to the noise estimator 300 is transferred to the estimated noise calculator 310 and weighted deteriorated voice calculator 320. The weighted deteriorated voice calculator 320 uses the supplied deteriorated voice power spectrum and estimated noise power spectrum to calculate a weighted deteriorated voice power spectrum, and transfers it to the estimated noise calculator 310. The estimated noise calculator 310 uses the deteriorated voice power spectrum, weighted deteriorated voice power spectrum, and a count value supplied from the counter 330 to estimate a power spectrum of the noise, outputs the estimated noise power spectrum, and simultaneously therewith, feeds it back to the weighted deteriorated voice calculator 320.

Figure 6:
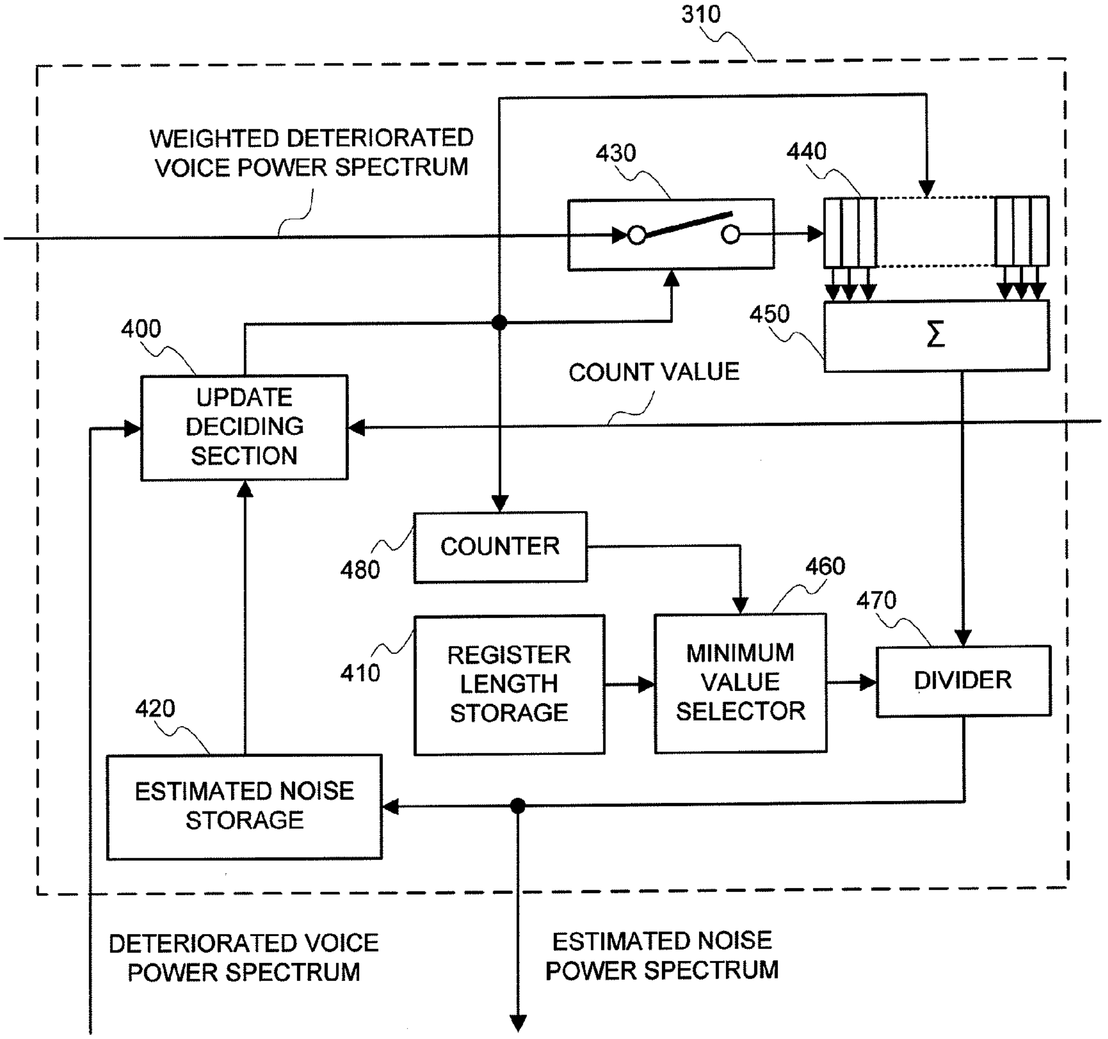
FIG. 6 is a block diagram showing a configuration of an estimated noise calculator included in FIG. 5.

FIG. 6 is a block diagram showing a configuration of the estimated noise calculator 310 included in FIG. 5. It comprises an update deciding section 400, a register length storage 410, an estimated noise storage 420, a switch 430, a shift register 440, an adder 450, a minimum value selector 460, a divider 470, and a counter 480. The switch 430 is supplied with the weighted deteriorated voice power spectrum. When the switch 430 closes the circuit, the weighted deteriorated voice power spectrum is transferred to the shift register 440. The shift register 440 shifts a value stored in its internal registers to adjacent registers in response to a control signal supplied from the update deciding section 400. The shift register length is equal to a value stored in the register length storage 410, which will be discussed later. All register outputs from the shift register 440 are supplied to the adder 450. The adder 450 adds all the supplied register outputs and transfers the result of the addition to the divider 470.

On the other hand, the update deciding section 400 is supplied with the count value, per-frequency deteriorated voice power spectrum, and per-frequency estimated noise power spectrum. The update deciding section 400 always outputs "one" until the count value reaches a predetermined value, and after the count value has reached the value, outputs "one" when the input deteriorated voice signal is decided to be a noise and otherwise outputs "zero", and transfers the output to the counter 480, switch 430 and shift register 440. The switch 430 closes the circuit when the signal supplied from the update deciding section is "one", and opens the circuit when the signal is "zero". The counter 480 increments the count value when the signal supplied from the update deciding section is "one", and makes no change when the signal is "zero". The shift register 440 takes up one of the signal samples supplied from the switch 430 when the signal supplied from the update deciding section is "one", and simultaneously therewith, shifts the value stored in its internal registers to adjacent registers. The minimum value selector 460 is supplied with outputs of the counter 480 and of the register length storage 410.

The minimum value selector 460 selects a smaller one of the supplied count value and register length, and transfers it to the divider 470. The divider 470 divides the added value of deteriorated voice power spectrum supplied from the adder 450 by a smaller one of the count value and register length, and outputs the quotient as a per-frequency estimated noise power spectrum $\lambda_n(k)$. Representing a sampled value of the deteriorated voice power spectrum saved in the shift register 440 as $B_n(k)$ (n=0, 1, . . . , N−1), $\lambda_n(k)$ is given by:

$$\lambda_n(k) = \frac{1}{N}\sum_{n=0}^{N-1} B_n(k) \qquad \text{[Equation 8]}$$

where N is a smaller one of the count value and register length. Since the count value monotonically increases starting with zero, division is initially made by the count value, and later, by the register length. Division by the register length is equivalent to calculation of an average of the values stored in the shift register. Since an insufficient number of values are initially stored in the shift register 440, division is made by the number of registers in which a value is actually stored. The number of registers in which a value is actually stored is equal to the count value when the count value is smaller than the register length, and equal to the register length when the count value is larger than the register length.

Figure 7:
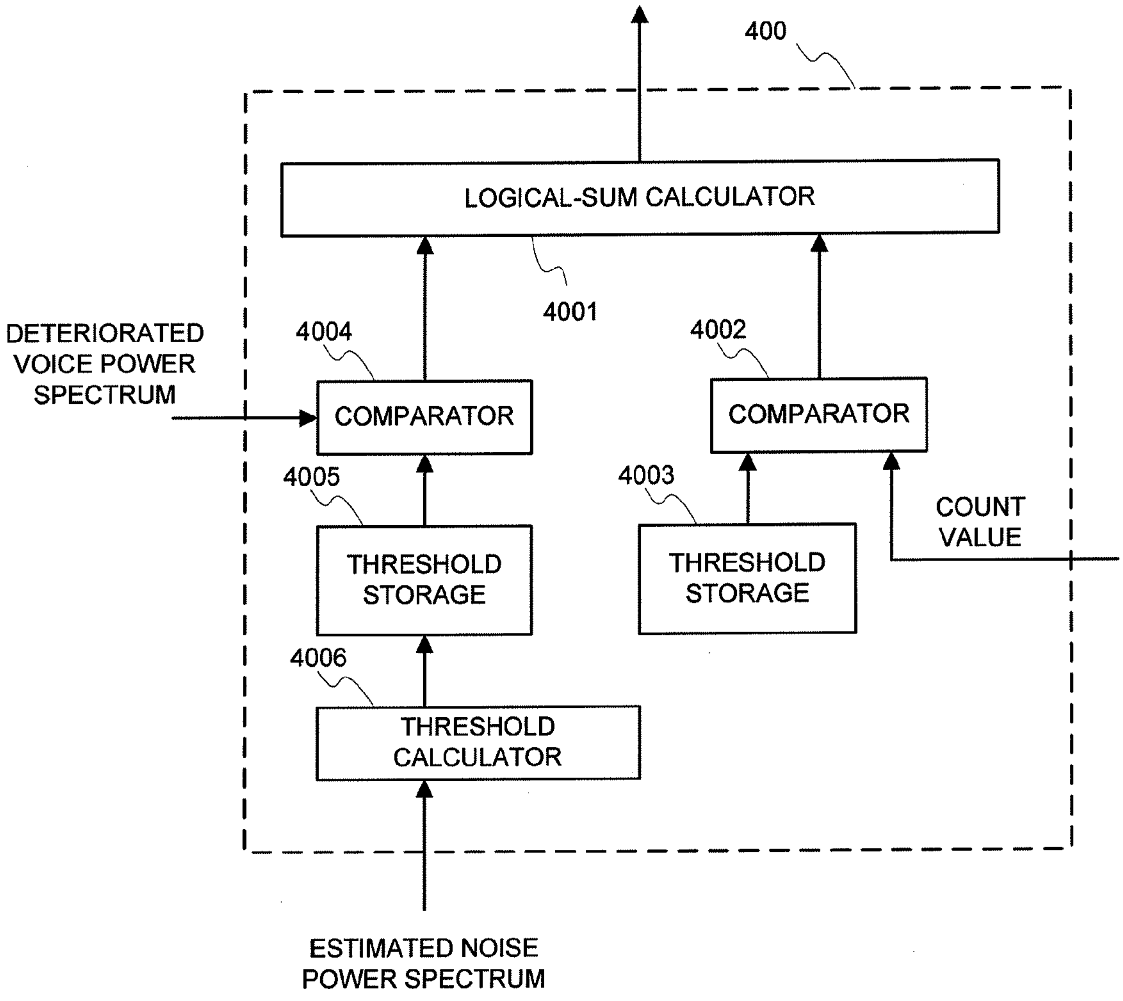
FIG. 7 is a block diagram showing a configuration of an update deciding section included in FIG. 6.

FIG. 7 is a block diagram showing a configuration of the update deciding section 400 included in FIG. 6. The update deciding section 400 comprises a logical-sum calculator 4001, comparators 4004, 4002, threshold storages 4005, 4003, and a threshold calculator 4006. The count value supplied from the counter 330 in FIG. 5 is transferred to the comparator 4002. A threshold that is an output of the threshold storage 4003 is also transferred to the comparator 4002. The comparator 4002 compares the supplied count value with the threshold, and transfers "one" when the count value is smaller than the threshold, and "zero" when the count value is larger than the threshold, to the logical-sum calculator 4001. On the other hand, the threshold calculator 4006 calculates a value corresponding to the estimated noise power spectrum supplied from the estimated noise storage 420 in FIG. 6, and outputs it to the threshold storage 4005 as a threshold. The simplest method of calculating the threshold is a constant value times the estimated noise power spectrum. It is also possible to calculate the threshold using a higher-order polynomial or a non-linear function. The threshold storage 4005 stores the threshold output from the threshold calculator 4006, and outputs the threshold stored for an immediately preceding frame to the comparator 4004. The comparator 4004 compares the threshold supplied from the threshold storage 4005 with the deteriorated voice power spectrum supplied from the converter 2 in FIG. 2, and outputs "one" when the deteriorated voice power spectrum is smaller than the threshold, and "zero" when the deteriorated voice power spectrum is larger, to the logical-sum calculator 4001. That is, decision is made as to whether the deteriorated voice signal is a noise based on the magnitude of the estimated noise power spectrum. The logical-sum calculator 4001 calculates a logical sum of the output values of the comparators 4002, 4004, and outputs the result of the calculation to the switch 430, shift register 440 and counter 480 in FIG. 6. Thus, the update deciding section 400 outputs "one" not only in the initial state or in the non-voiced segment but also in the voiced segment when the deteriorated voice power is small. That is, the estimated noise is updated. Since the threshold is calculated per frequency, the estimated noise can be updated per frequency.

Figure 8:
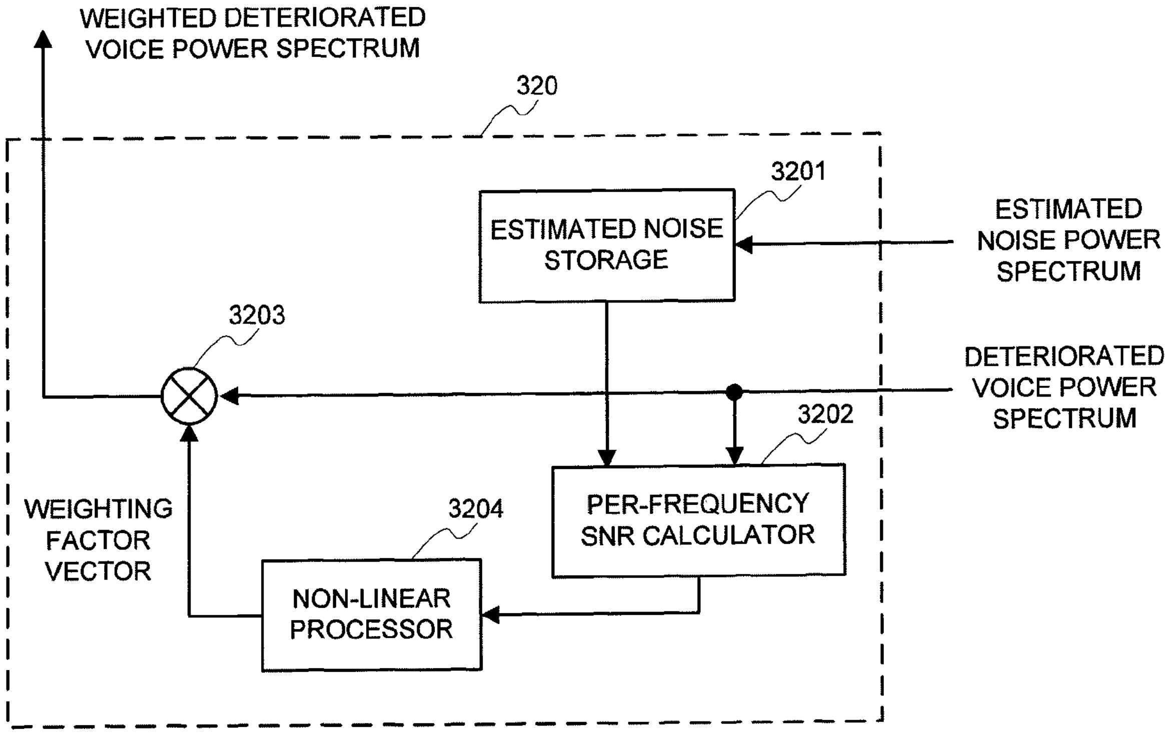
FIG. 8 is a block diagram showing a configuration of a weighted deteriorated voice calculator included in FIG. 5.

FIG. 8 is a block diagram showing a configuration of the weighted deteriorated voice calculator 320. The weighted deteriorated voice calculator 320 comprises an estimated noise storage 3201, a per-frequency SNR calculator 3202, a non-linear processor 3204, and a multiplier 3203. The estimated noise storage 3201 stores the estimated noise power spectrum supplied from the estimated noise calculator 310 in FIG. 5, and outputs the estimated noise power spectrum stored for an immediately preceding frame to the per-frequency SNR calculator 3202. The per-frequency SNR calculator 3202 uses the estimated noise power spectrum supplied from the estimated noise storage 3201 and deteriorated voice power spectrum supplied from the converter 2 in FIG. 2 to calculate an SNR for each frequency band, and outputs it to the non-linear processor 3204. In particular, the supplied deteriorated voice power spectrum is divided by the estimated noise power spectrum to calculate a per-frequency SNR $\gamma_n(k)$ hat according to the following equation:

$$\hat{\gamma}_n(k) = \frac{|Y_n(k)|^2}{\lambda_{n-1}(k)} \qquad \text{[Equation 9]}$$

where $\lambda_{n-1}(k)$ is an estimated noise power spectrum stored for an immediately preceding frame.

The non-linear processor 3204 uses the SNR supplied from the per-frequency SNR calculator 3202 to calculate a weighting factor vector, and outputs it to the multiplier 3203. The multiplier 3203 calculates a product of the deteriorated voice power spectrum supplied from the converter 2 in FIG. 2 and weighting factor vector supplied from the non-linear processor 3204 for each frequency band, and outputs a weighted deteriorated voice power spectrum to the estimated noise calculator 310 in FIG. 5.

Figure 9:
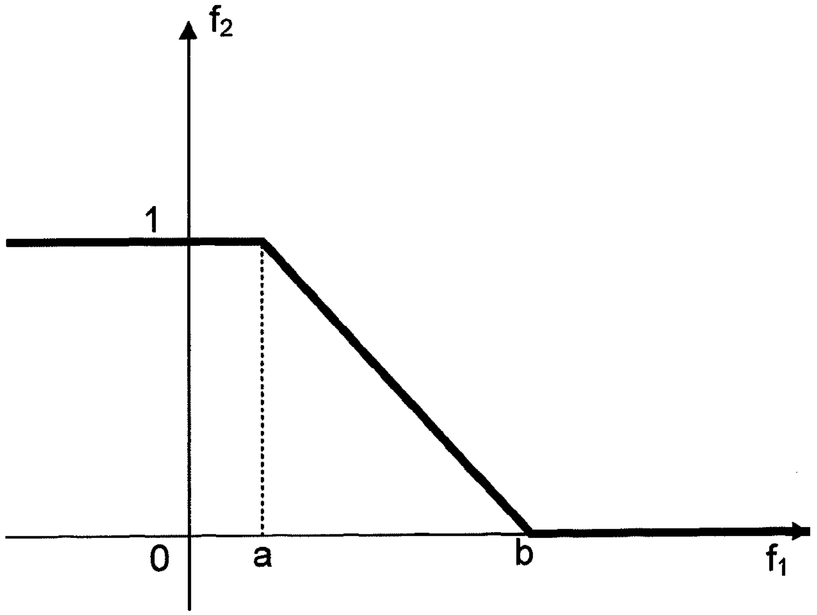
FIG. 9 is a graph showing an example of a non-linear function in a non-linear processor included in FIG. 8.

The non-linear processor 3204 has a non-linear function that outputs real values corresponding to respective multiplexed input values. FIG. 9 shows an example of the non-linear function. Representing an input value as $f_1$, an output value $f_2$ of the non-linear function provided in FIG. 9 is given by:

$$f_2 = \begin{cases} 1, & f_1 \leq a \\ \frac{f_1 - b}{a - b}, & a < f_1 \leq b \\ 0, & b < f_1 \end{cases} \quad \text{[Equation 10]}$$

where a and b are arbitrary real numbers.

The non-linear processor 3204 processes the per-frequency-band SNR supplied from the per-frequency SNR calculator 3202 with the non-linear function to obtain a weighting factor, and transfers it to the multiplier 3203. That is, the non-linear processor 3204 outputs a weighting factor from one to zero according to SNR. It outputs one for a smaller SNR and zero for a larger SNR.

The weighting factor multiplied with the deteriorated voice power spectrum at the multiplier 3203 in FIG. 8 has a value corresponding to SNR, and the value of the weighting factor is smaller for a larger SNR, i.e., for a larger voice component contained in the deteriorated voice. While in general the estimated noise is updated using the deteriorated voice power spectrum, an effect of the voice component contained in the deteriorated voice power spectrum can be reduced by performing weighting on the deteriorated voice power spectrum for use in updating the estimated noise according to SNR, thus achieving noise estimation with higher precision. It should be noted that although a case in which the weighting factor is calculated using a non-linear function is shown herein, it is possible to use for the SNR function expressed in another form, such as linear function or higher-order polynomial, as well as the non-linear function.

Figure 10:
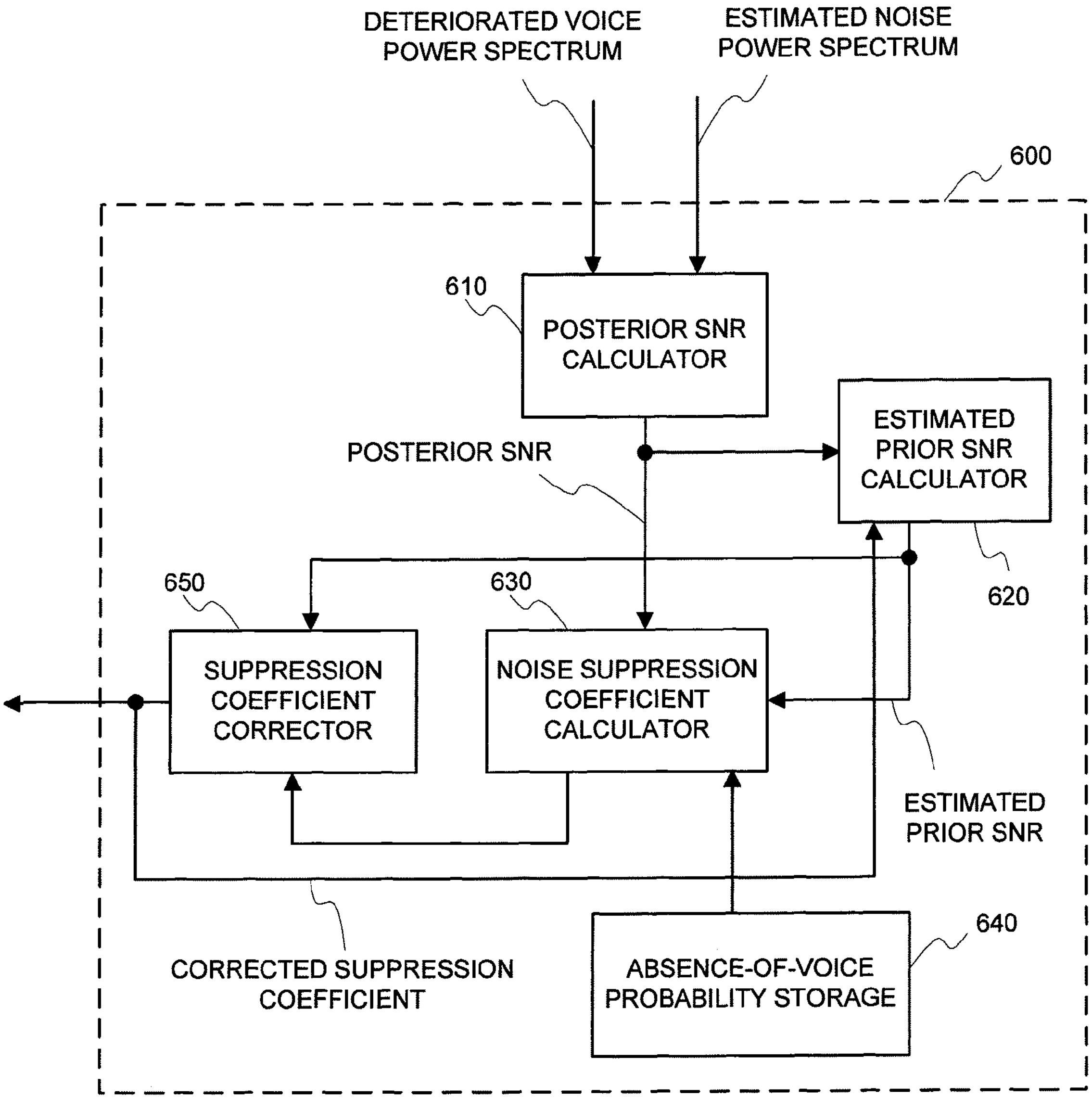
FIG. 10 is a block diagram showing a configuration of a noise suppression coefficient generator included in FIG. 2.

FIG. 10 is a block diagram showing a configuration of the noise suppression coefficient generator 600 included in FIG. 2. The noise suppression coefficient generator 600 comprises a posterior SNR calculator 610, an estimated prior SNR calculator 620, a noise suppression coefficient calculator 630, an absence-of-voice probability storage 640, and a suppression coefficient corrector 650. The posterior SNR calculator 610 uses the input deteriorated voice power spectrum and estimated noise power spectrum to calculate a posterior SNR for each frequency, and supplies it to the estimated prior SNR calculator 620 and noise suppression coefficient calculator 630. The estimated prior SNR calculator 620 uses the input posterior SNR, and a corrected suppression coefficient supplied from the suppression coefficient corrector 650 to estimate a prior SNR, and transfers the estimated prior SNR to the noise suppression coefficient calculator 630. The noise suppression coefficient calculator 630 uses as input the posterior SNR supplied, estimated prior SNR, and an absence-of-voice probability supplied from the absence-of-voice probability storage 640 to generate a noise suppression coefficient, and transfers it to the suppression coefficient corrector 650. The suppression coefficient corrector 650 uses the input estimated prior SNR and noise suppression coefficient to correct the noise suppression coefficient, and outputs the corrected suppression coefficient $G_n(k)$bar.

Figure 11:
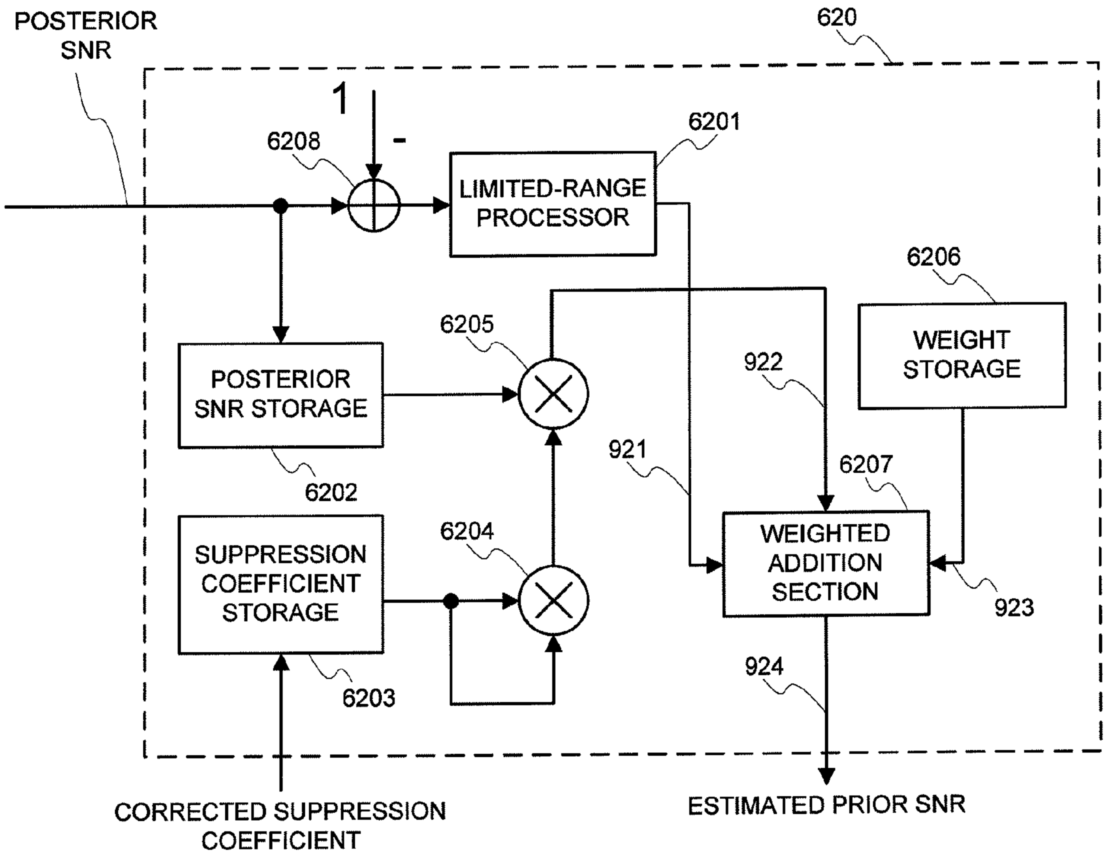
FIG. 11 is a block diagram showing a configuration of an estimated prior SNR calculator included in FIG. 10.

FIG. 11 is a block diagram showing a configuration of the estimated prior SNR calculator 620 included in FIG. 10. The estimated prior SNR calculator 620 comprises a limited-range processor 6201, a posterior SNR storage 6202, a suppression coefficient storage 6203, multipliers 6204, 6205, a weight storage 6206, a weighted addition section 6207, and an adder 6208. A posterior SNR $\gamma_n(k)$ (k=0, 1, . . . , M−1) supplied from the posterior SNR calculator 610 in FIG. 10 is transferred to the posterior SNR storage 6202 and adder 6208. The posterior SNR storage 6202 stores the posterior SNR $\gamma_n(k)$ in an n-th frame, and transfers a posterior SNR $\gamma_{n-1}(k)$ in an (n−1)-th frame to the multiplier 6205. The corrected suppression coefficient $G_n(k)$bar (k=0, 1, . . . , M−1) supplied from the suppression coefficient corrector 650 in FIG. 10 is transferred to the suppression coefficient storage 6203. The suppression coefficient storage 6203 stores the corrected suppression coefficient $G_n(k)$bar in the n-th frame, and transfers a corrected suppression coefficient $G_{n-1}(k)$bar in the (n−1)-th frame to the multiplier 6204. The multiplier 6204 squares the supplied $G_n(k)$bar to calculate $G^2_{n-1}(k)$bar, and transfers it to the multiplier 6205. The multiplier 6205 multiplies $G^2_{n-1}(k)$ bar with $\gamma_{n-1}(k)$ for k=0, 1, . . . , M−1 to calculate $G^2_{n-1}(k)$bar $\gamma_{n-1}(k)$, and transfers the result to the weighted addition section 6207 as a previous estimated SNR 922.

Another terminal of the adder 6208 is supplied with minus one, and the result of addition $\gamma_n(k)-1$ is transferred to the limited-range processor 6201. The limited-range processor 6201 applies a calculation by a limited-range operator P[x] to the result of addition $\gamma_n(k)-1$ supplied from the adder 6208, and transfers the resulting $P[\gamma_n(k)-1]$ to the weighted addition section 6207 as an instantaneous estimated SNR 921. P[x] is defined by the following equation:

$$P[x] = \begin{cases} x, & x > 0 \\ 0, & x \leq 0 \end{cases} \quad \text{[Equation 11]}$$

The weighted addition section 6207 is also supplied with a weight 923 from the weight storage 6206. The weighted addition section 6207 uses these supplied instantaneous estimated SNR 921, previous estimated SNR 922 and weight 923 to calculate an estimated prior SNR 924. Representing the weight 923 as α and the estimated prior SNR as $\xi_n(k)$hat, $\xi_n(k)$hat is calculated according to the following equation:

$$\hat{\xi}_n(k) = \alpha\gamma_{n-1}(k)\overline{G}_{n-1}^2(k) + (1-\alpha)P[\gamma_n(k)-1] \quad \text{[Equation 12]}$$

where $G^2_{-1}(k)\ \gamma_{-1}(k)$ bar=1.

Figure 12:
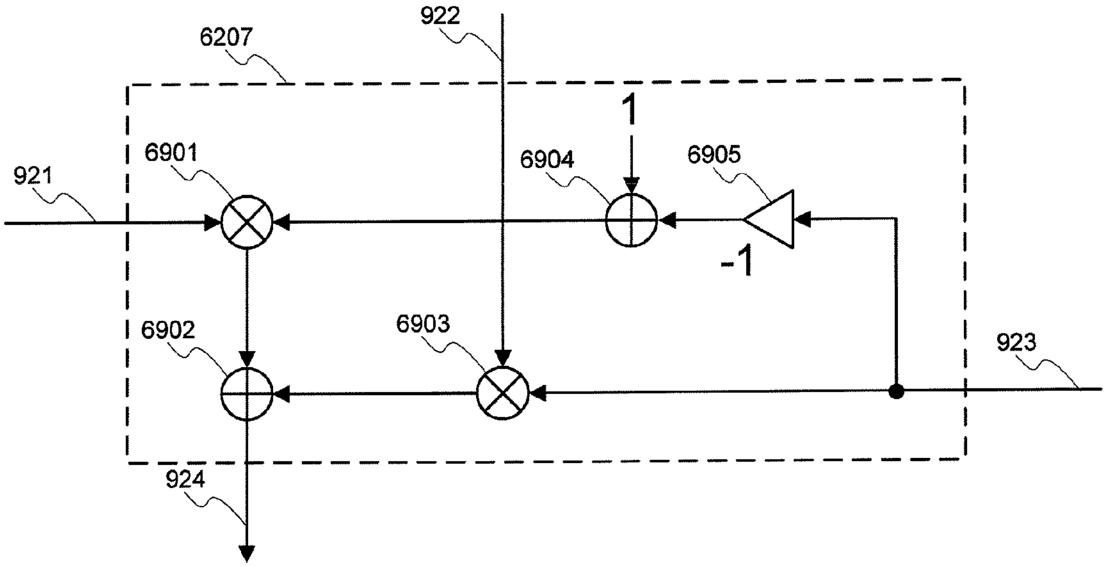
FIG. 12 is a block diagram showing a configuration of a weighted addition section included in FIG. 11.

FIG. 12 is a block diagram showing a configuration of the weighted addition section 6207 included in FIG. 11. The weighted addition section 6207 comprises multipliers 6901, 6903, a constant multiplier 6905, and adders 6902, 6904. There are supplied as input the per-frequency-band instantaneous estimated SNR 921 from the limited-range processor 6201 in FIG. 11, per-frequency-band previous SNR 922 from the multiplier 6205 in FIG. 11, and weight 923 from the weight storage 6206 in FIG. 11. The weight 923 having a value of α is transferred to the constant multiplier 6905 and multiplier 6903. The constant multiplier 6905 transfers −α obtained by multiplying the input signal by minus one to the adder 6904. Another input to the adder 6904 is supplied with a value of one, so that the output of the adder 6904 is a sum of them, 1−α. 1−α is supplied to the multiplier 6901 for multiplication with the other input, i.e., per-frequency-band instantaneous estimated SNR $P[\gamma_n(k)-1]$, and a product $(1-\alpha)P[\gamma_n(k)-1]$ is transferred to the adder 6902. On the other hand, at the multiplier 6903, α supplied as the weight 923 is multiplied with the previous estimated SNR 922, and a product $\alpha G^2_{n-1}(k)\text{bar } \gamma_{n-1}(k)$ is transferred to the adder 6902. The adder 6902 outputs a sum of $(1-\alpha)P[\gamma_n(k)-1]$ and $\alpha G^2_{n-1}(k)$ bar $\gamma_{n-1}(k)$ as a per-frequency-band estimated prior SNR 924.

Figure 13:
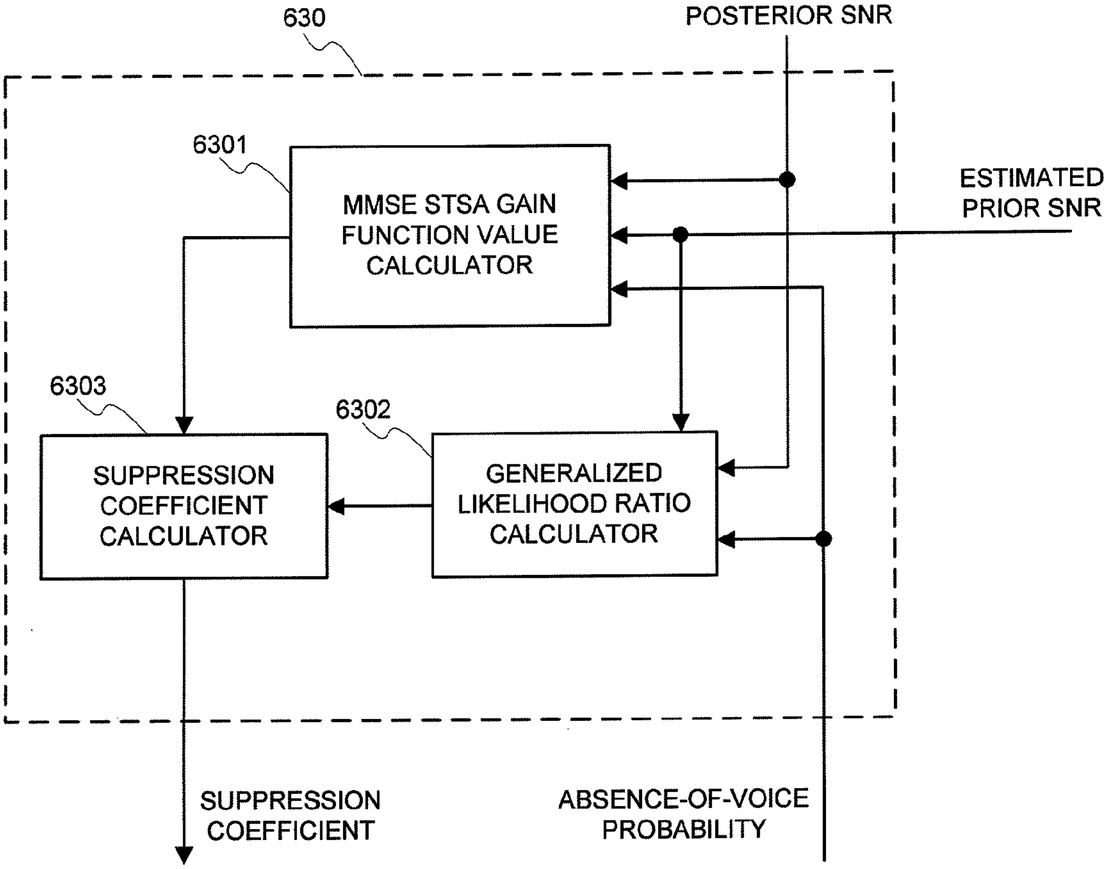
FIG. 13 is a block diagram showing a configuration of a noise suppression coefficient calculator included in FIG. 10.

FIG. 13 is a block diagram showing the noise suppression coefficient calculator 630 included in FIG. 10. The noise suppression coefficient calculator 630 comprises an MMSE STSA gain function value calculator 6301, a generalized likelihood ratio calculator 6302, and a suppression coefficient calculator 6303. The following description will be made on a method of calculating a suppression coefficient based on a formula described in Non-patent Document 2 (Non-patent Document 2: IEEE Transactions on Acoustics, Speech, and Signal Processing, Vol. 32, No. 6, pp. 1109-1121, December 1984).

A frame index is denoted by n, a frequency index is denoted by k, $\gamma_n(k)$ represents a per-frequency posterior SNR supplied from the posterior SNR calculator 610 in FIG. 10, $\xi_n(k)$hat represents a per-frequency estimated prior SNR supplied from the estimated prior SNR calculator 620 in FIG. 10, and q represents an absence-of-voice probability supplied from the absence-of-voice probability storage 640 in FIG. 10.

Moreover, $\eta_n(k)=\xi_n(k)\text{hat}/(1-q)$, and $v_n(k)=(\eta_n(k)\gamma_n(k))/(1+\eta_n(k))$ are assumed.

The MMSE STSA gain function value calculator 6301 calculates an MMSE STSA gain function value for each frequency band based on the posterior SNR $\gamma_n(k)$ supplied from the posterior SNR calculator 610 in FIG. 10, estimated prior SNR $\xi_n(k)$hat supplied from the estimated prior SNR calculator 620 in FIG. 10, and absence-of-voice probability q supplied from the absence-of-voice probability storage 640 in FIG. 10, and outputs it to the suppression coefficient calculator 6303. The MMSE STSA gain function value $G_n(k)$ for each frequency band is given by:

$$G_n(k) = \frac{\sqrt{\pi}}{2}\frac{\sqrt{v_n(k)}}{\gamma_n(k)} \exp\left(-\frac{v_n(k)}{2}\right)\left[(1+v_n(k))I_0\left(\frac{v_n(k)}{2}\right)+v_n(k)I_1\left(\frac{v_n(k)}{2}\right)\right] \quad \text{[Equation 13]}$$

where $I_0(z)$ is a zero-th order modified Bessel function, and $I_1(z)$ is a first-order modified Bessel function. The modified Bessel function is described in Non-patent Document 3 (Non-patent Document 3: Encyclopedia of Mathematics, published by Iwanami Shoten, 1985, p. 374.G).

The generalized likelihood ratio calculator 6302 calculates a generalized likelihood ratio for each frequency band based on the posterior SNR $\gamma_n(k)$ supplied from the posterior SNR calculator 610 in FIG. 10, estimated prior SNR $\xi_n(k)$hat supplied from the estimated prior SNR calculator 620 in FIG. 10, and absence-of-voice probability q supplied from the absence-of-voice probability storage 640 in FIG. 10, and transfers it to the suppression coefficient calculator 6303. A generalized likelihood ratio $\Lambda_m(k)$ for each frequency band is given by:

$$\Lambda_n(k) = \frac{1-q}{q}\frac{\exp(v_n(k))}{1+\eta_n(k)} \quad \text{[Equation 14]}$$

The suppression coefficient calculator 6303 calculates a suppression coefficient for each frequency band using the MMSE STSA gain function value $G_n(k)$ supplied from the MMSE STSA gain function value calculator 6301 and the generalized likelihood ratio $\Lambda_n(k)$ supplied from the generalized likelihood ratio calculator 6302, and outputs it to the suppression coefficient corrector 650 in FIG. 10. The suppression coefficient $G_n(k)$bar for each frequency band is given by:

$$\overline{G}_n(k) = \frac{\Lambda_n(k)}{\Lambda_n(k)+1}G_n(k) \quad \text{[Equation 15]}$$

It is also possible to calculate for use an SNR that is common over a wide band comprised of a plurality of frequency bands, rather than calculating an SNR for each frequency band.

Figure 14:
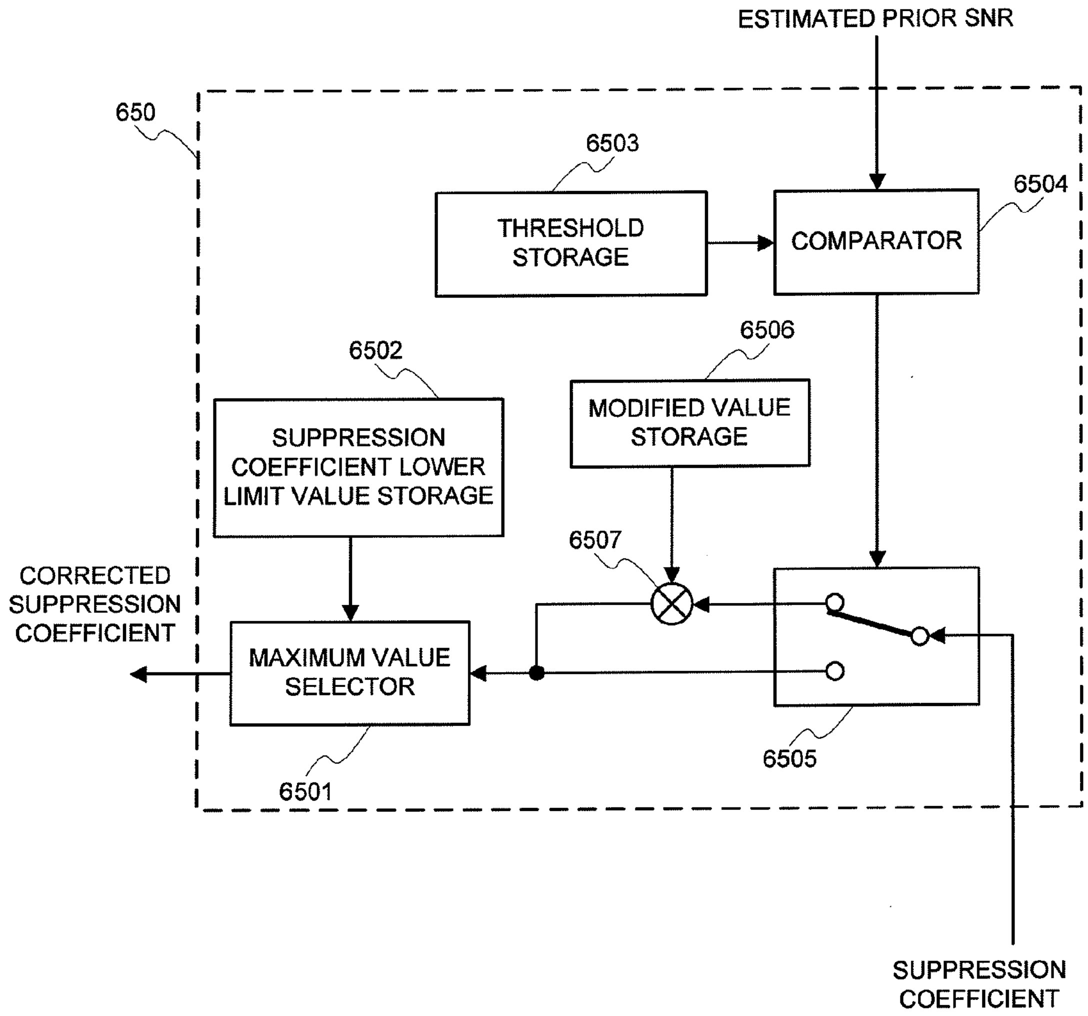
FIG. 14 is a block diagram showing a configuration of a suppression coefficient corrector included in FIG. 10.

FIG. 14 is a block diagram showing the suppression coefficient corrector 650 included in FIG. 10. The suppression coefficient corrector 650 comprises a maximum value selector 6501, a suppression coefficient lower limit value storage 6502, a threshold storage 6503, a comparator 6504, a switch 6505, a modified value storage 6506, and a multiplier 6507. The comparator 6504 compares a threshold supplied from the threshold storage 6503 with the estimated prior SNR supplied from the estimated prior SNR calculator 620 in FIG. 10, and supplies "zero" when the estimated prior SNR is larger than the threshold, and "one" when the estimated prior SNR is smaller, to the switch 6505. The switch 6505 outputs the suppression coefficient supplied from the noise suppression coefficient calculator 630 in FIG. 10 to the multiplier 6507 when the output value of the comparator 6504 is "one", and to the maximum value selector 6501 when the output value is "zero". That is, the suppression coefficient is corrected when the estimated prior SNR is smaller than the threshold. The multiplier 6507 calculates a product of the output values of the switch 6505 and of modified value storage 6506, and transfers the product to the maximum value selector 6501.

On the other hand, the suppression coefficient lower limit value storage 6502 supplies a lower limit value of the suppression coefficient that it stores, to the maximum value selector 6501. The maximum value selector 6501 compares the suppression coefficient supplied from the noise suppression coefficient calculator 630 in FIG. 10 or the product calculated at the multiplier 6507 with the suppression coefficient lower limit value supplied from the suppression coefficient lower limit value storage 6502, and outputs a larger one of them. That is, the suppression coefficient always becomes a value larger than the lower limit value stored in the suppression coefficient lower limit value storage 6502.

In the preceding embodiments, description has been made on a case in which the suppression coefficient is independently calculated for each frequency component and used to achieve noise suppression according to Patent Document 1. However, to reduce computational complexity, a suppression coefficient common to a plurality of frequency components may be calculated and used to achieve noise suppression, as disclosed in Non-patent Document 1. In such a case, the configuration additionally comprises a band combining section between the converter 2, and noise estimator 300 and noise suppression coefficient generator 600 in FIG. 2.

Furthermore, as found in Non-patent Document 1, a high-pass filter may be formed in a frequency domain to reduce computational complexity, by providing an offset removing section in front of the converter 2 in FIG. 2 and an amplitude corrector and a phase corrector immediately after the converter 2. In addition, in calculating the suppression coefficient common to a plurality of frequency components, the estimated noise value may be corrected corresponding to a specific frequency band.

Figure 15:
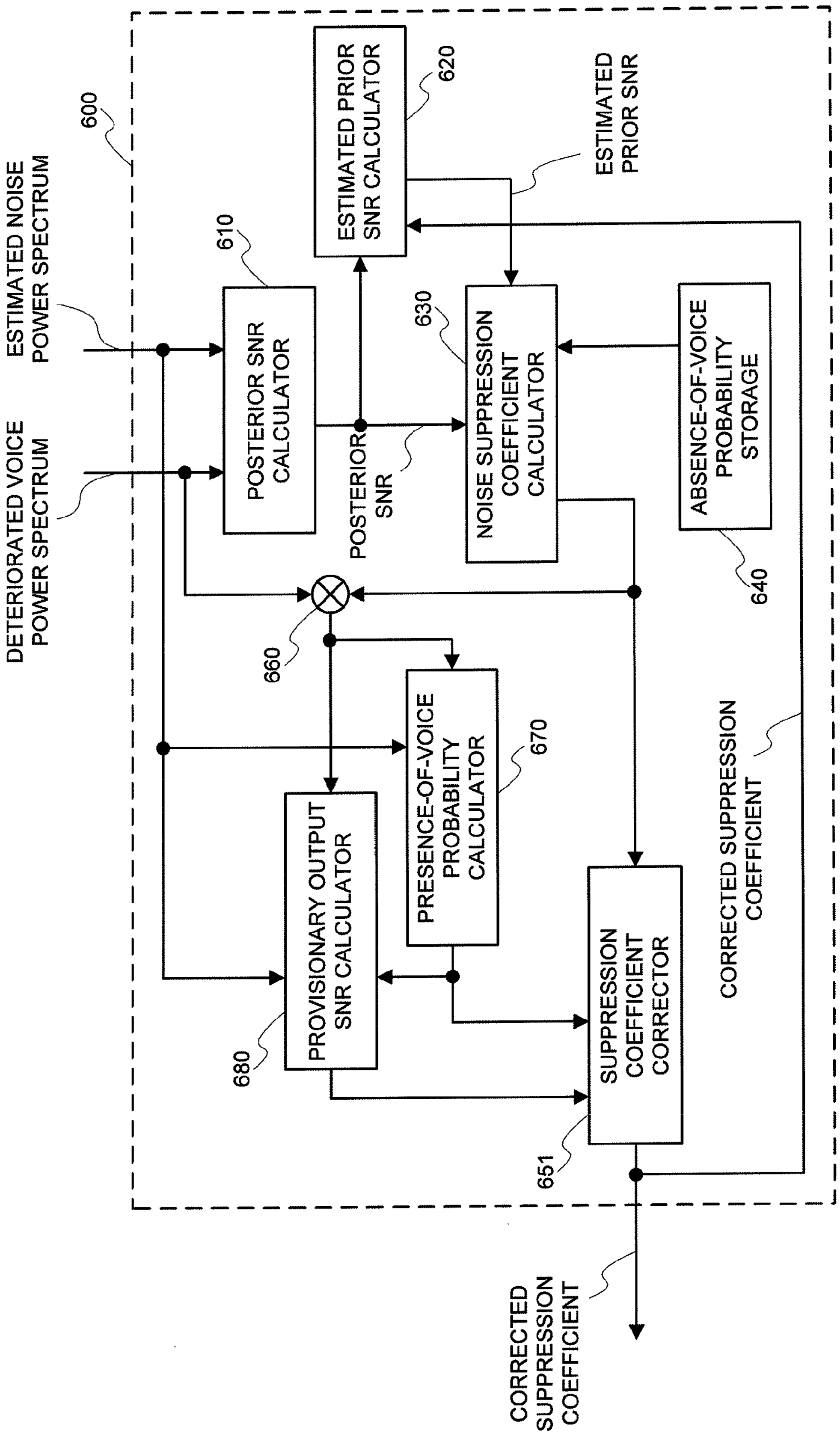
FIG. 15 is a block diagram showing a second configuration of a suppression coefficient generator included in FIG. 2.

FIG. 15 shows a second embodiment of the noise suppression coefficient generator 600. As compared with the first embodiment shown in FIG. 10, the noise suppression coefficient generator 600 of the second embodiment comprises, in place of the suppression coefficient corrector 650, a suppression coefficient corrector 651, a multiplier 660, a presence-of-voice probability calculator 670, and a provisionary output SNR calculator 680. The presence-of-voice probability calculator 670 and provisionary output SNR calculator 680 are supplied with the estimated noise power spectrum given as an input. The multiplier 660 is supplied with the deteriorated voice power spectrum and suppression coefficient obtained at the noise suppression coefficient calculator 630 given as an input. The multiplier 660 calculates a product thereof as a provisionary output signal, and transfers it to the provisionary output SNR calculator 680 and presence-of-voice probability calculator 670. The presence-of-voice probability calculator 670 uses the estimated noise power spectrum and provisionary output signal to calculate a presence-of-voice probability $V_n$. An example of the presence-of-voice probability that can be used is a ratio of the provisionary output signal to the estimated noise. A larger value of the ratio gives a higher presence-of-voice probability, and a smaller value of the ratio gives a lower presence-of-voice probability. The calculated presence-of-voice probability $V_n$ is supplied to the provisionary output SNR calculator 680 and suppression coefficient corrector 651.

The provisionary output SNR calculator 680 uses the estimated noise power spectrum and provisionary output signal to calculate a provisionary output SNR, and transfers it to the suppression coefficient corrector 651. An example of the provisionary output SNR that can be used is a long-term output SNR by the long-term average of the provisionary output and the estimated noise power spectrum. The long-term average of the provisionary output is updated according to the magnitude of the presence-of-voice probability $V_n$ supplied from the presence-of-voice probability calculator 670. The calculated provisionary output SNR $\xi_n^L(k)$ is supplied to the suppression coefficient corrector 651. The suppression coefficient corrector 651 corrects the suppression coefficient $G_n$(k)bar received from the noise suppression coefficient calculator 630 using the presence-of-voice probability $V_n$ received from the presence-of-voice probability calculator 670 and provisionary output SNR $\xi_n^L(k)$ received from the provisionary output SNR calculator 680 to output a corrected suppression coefficient $G_n$(k)hat, and simultaneously therewith, feeds it back to the estimated prior SNR calculator 620.

Figure 16:
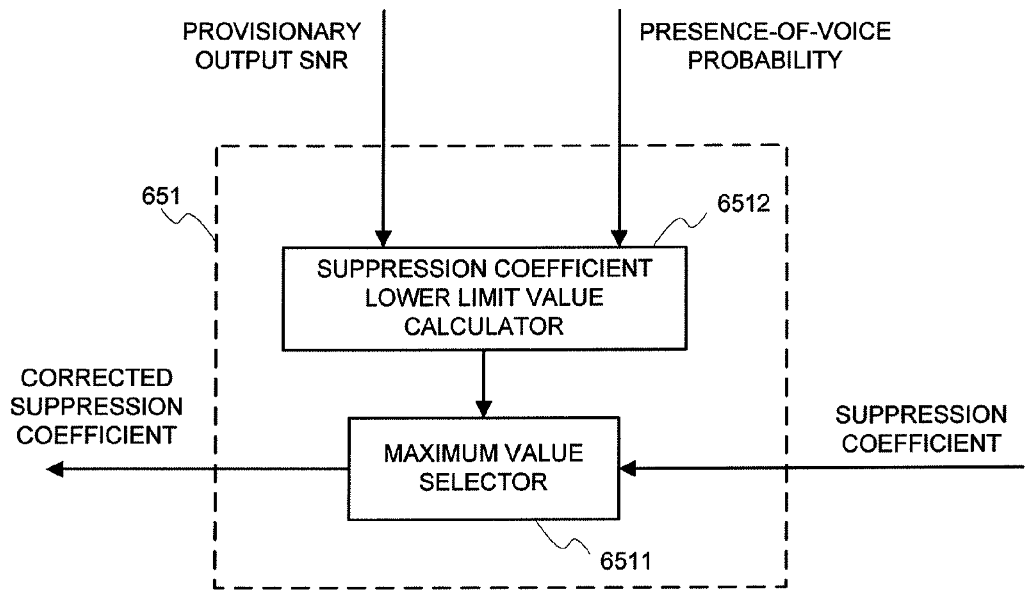
FIG. 16 is a block diagram showing a configuration of a suppression coefficient corrector included in FIG. 15.

FIG. 16 shows an embodiment of the suppression coefficient corrector 651. The suppression coefficient corrector 651 comprises a suppression coefficient lower limit value calculator 6512 and a maximum value selector 6511. The suppression coefficient lower limit value calculator 6512 is supplied with the provisionary output SNR $\xi_n^L(k)$ and presence-of-voice probability $V_n$. The suppression coefficient lower limit value calculator 6512 uses a function $A(\xi_n^L(k))$ and suppression coefficient minimum value $f_s$ corresponding to a voiced segment to calculate a of lower limit value $A(V_n, \xi_n^L(k))$ of the suppression coefficient based on the equation below, and transfers it to the maximum value selector 6511.

$$A(V_n,\xi_n^L(k))=f_s\cdot V_n+(1-V_n)\cdot A(\xi_n^L(k)) \quad \text{[Equation 16]}$$

The function $A(\xi_n^L(k))$ basically is of a shape having a smaller value for a larger SNR. The fact that $A(\xi_n^L(k))$ is a function having such a shape corresponding to the provisionary output SNR $\xi_n^L(k)$ implies that a higher provisionary output SNR gives a smaller lower limit value of the suppression coefficient corresponding to a non-voiced segment. This corresponds to a smaller residual noise, and provides an effect of reducing tone discontinuity between voiced and non-voiced segments. It should be noted that the function $A(\xi_n^L(k))$ may be different among all frequency components, or may be common to a plurality of frequency components. Moreover, the shape of the function may vary with time.

The maximum value calculator 6511 compares the suppression coefficient $G_n$(k)bar received from the noise suppression coefficient calculator 630 with a lower limit value received from the suppression coefficient lower limit value calculator 6512, and outputs a larger one of them as corrected suppression coefficient $G_n$(k)hat. This processing can be expressed by the following equation:

$$\hat{G}_n(k)=\begin{cases}\overline{G}_n(k) & \overline{G}_n(k)\geq A(V_n,\xi_n^L(k))\\ A(V_n,\xi_n^L(k)) & \overline{G}_n(k)<A(V_n,\xi_n^L(k)).\end{cases} \quad \text{[Equation 17]}$$

Specifically, in a case that it is likely to be completely a voiced segment, $f_s$ is set to the suppression coefficient minimum value, and in a case that it is likely to be completely a non-voiced segment, a value determined by a monotonically decreasing function according to the provisionary output SNR $\xi_n^L(k)$ is set to the suppression coefficient minimum value. In a situation that it is likely to be intermediate of them, these values are appropriately mixed. A monotonically decreasing nature of $A(\xi_n^L(k))$ ensures a large suppression coefficient minimum value for a low SNR, thus maintaining continuity from an immediately preceding voiced segment in which a large amount of noise is left over from noise removal. Control is made so that the suppression coefficient minimum value is reduced for a higher SNR, resulting in a lower residual noise. This is because the residual noise is so low as to be negligible in the voiced segment and therefore continuity is maintained even when the residual noise is low in the non-voiced segment. Moreover, by setting $f_s$ to be larger than $A(\xi_n^L(k))$, noise suppression can be mitigated in a voiced segment or likely-to-be voiced segment to reduce distortion occurring in the voice. This is particularly effective when accuracy in noise estimation cannot sufficiently be improved in the voice mixed with distortion introduced by encoding/decoding.

Figure 17:
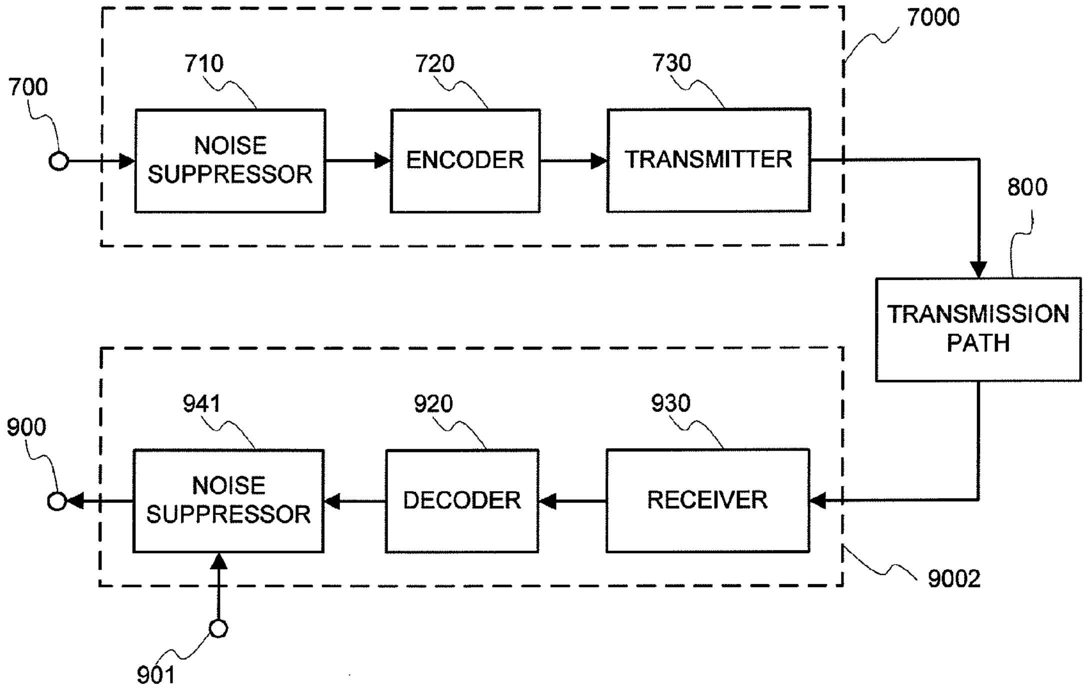
FIG. 17 is a block diagram showing a second mode for carrying out the present invention.

FIG. 17 is a block diagram showing a second mode for carrying out the present invention. FIG. 17 is similar to FIG. 1 showing the best mode for carrying out the present invention except that the noise suppressor 940 is replaced with a noise suppressor 941 in the receiver terminal 9002. The noise suppressor 941 is supplied with an input signal from the input terminal 901, unlike in the noise suppressor 940. The signal supplied to the input terminal 901 contains information for controlling the degree of suppression made by the noise suppressor 941, and is transferred to the noise suppressor 941. Such information for controlling the degree of suppression include a suppression coefficient, its lower limit value or the like.

Figure 18:
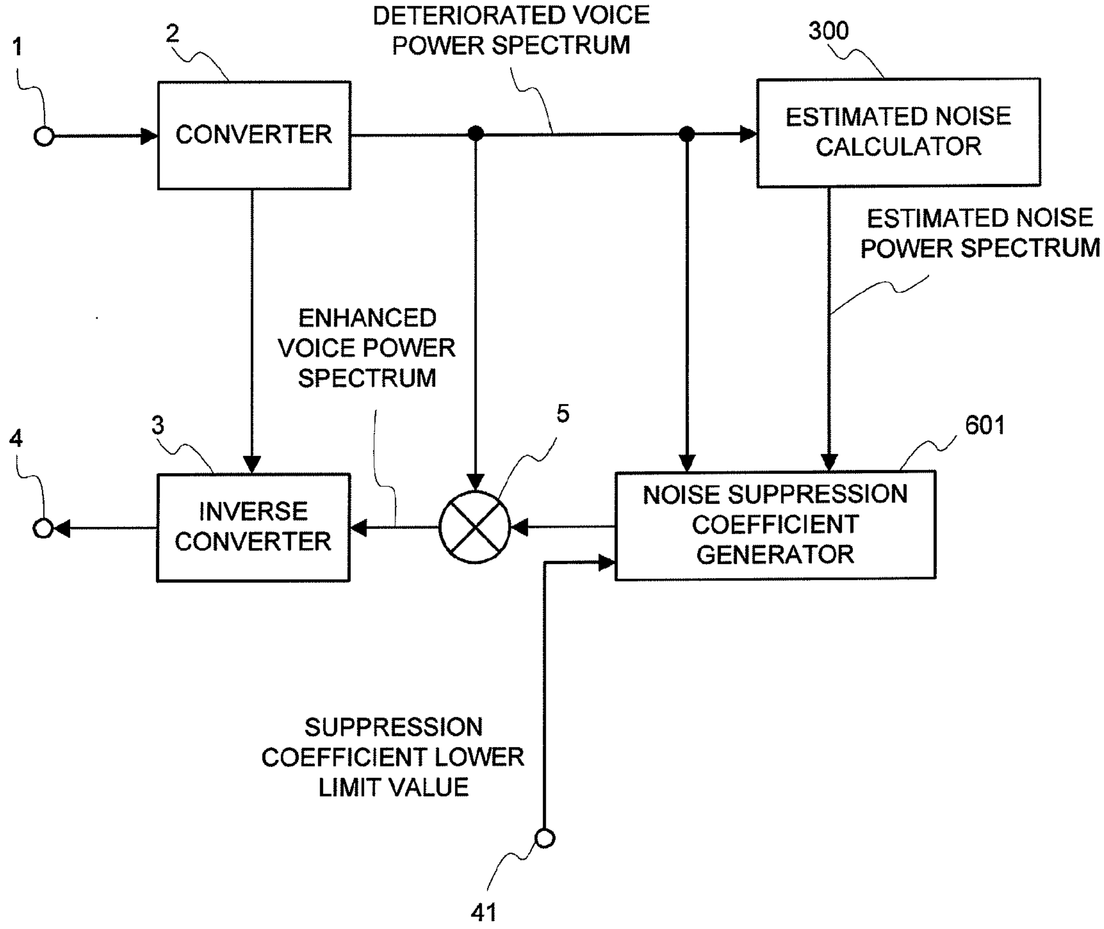
FIG. 18 is a block diagram showing a configuration of a noise suppressor included in FIG. 17.

FIG. 18 shows an exemplary configuration of the noise suppressor 941. A difference thereof from FIG. 2 showing the exemplary configuration of the noise suppressor 940 is that the noise suppression coefficient generator 600 is replaced with a noise suppression coefficient generator 601, to which the suppression coefficient lower limit value is supplied via an input terminal 41. The noise suppression coefficient generator 601 supplies to the multiplier 5 a suppression coefficient generated using the suppression coefficient lower limit value supplied via the input terminal 41.

Figure 19:
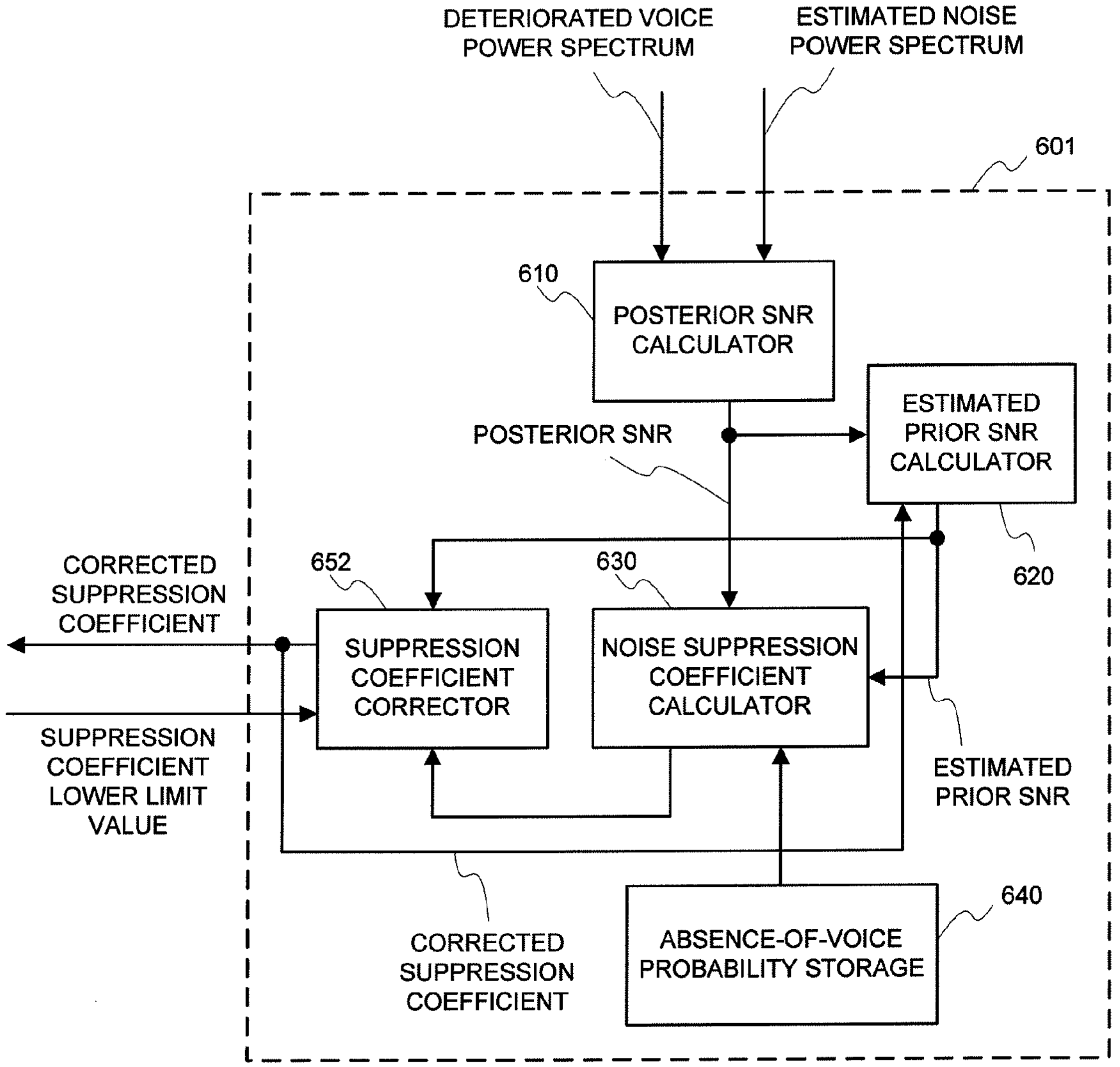
FIG. 19 is a block diagram showing a configuration of a noise suppression coefficient generator included in FIG. 18.

FIG. 19 shows an exemplary configuration of the noise suppression coefficient generator 601. A difference thereof from FIG. 10 showing the first exemplary configuration of the noise suppression coefficient generator 600 is that the suppression coefficient corrector 650 is replaced with a suppression coefficient corrector 652, to which the suppression coefficient lower limit value is supplied. The suppression coefficient corrector 652 uses the estimated prior SNR, noise suppression coefficient, and suppression coefficient lower limit value to correct the noise suppression coefficient, and outputs the corrected suppression coefficient.

Figure 20:
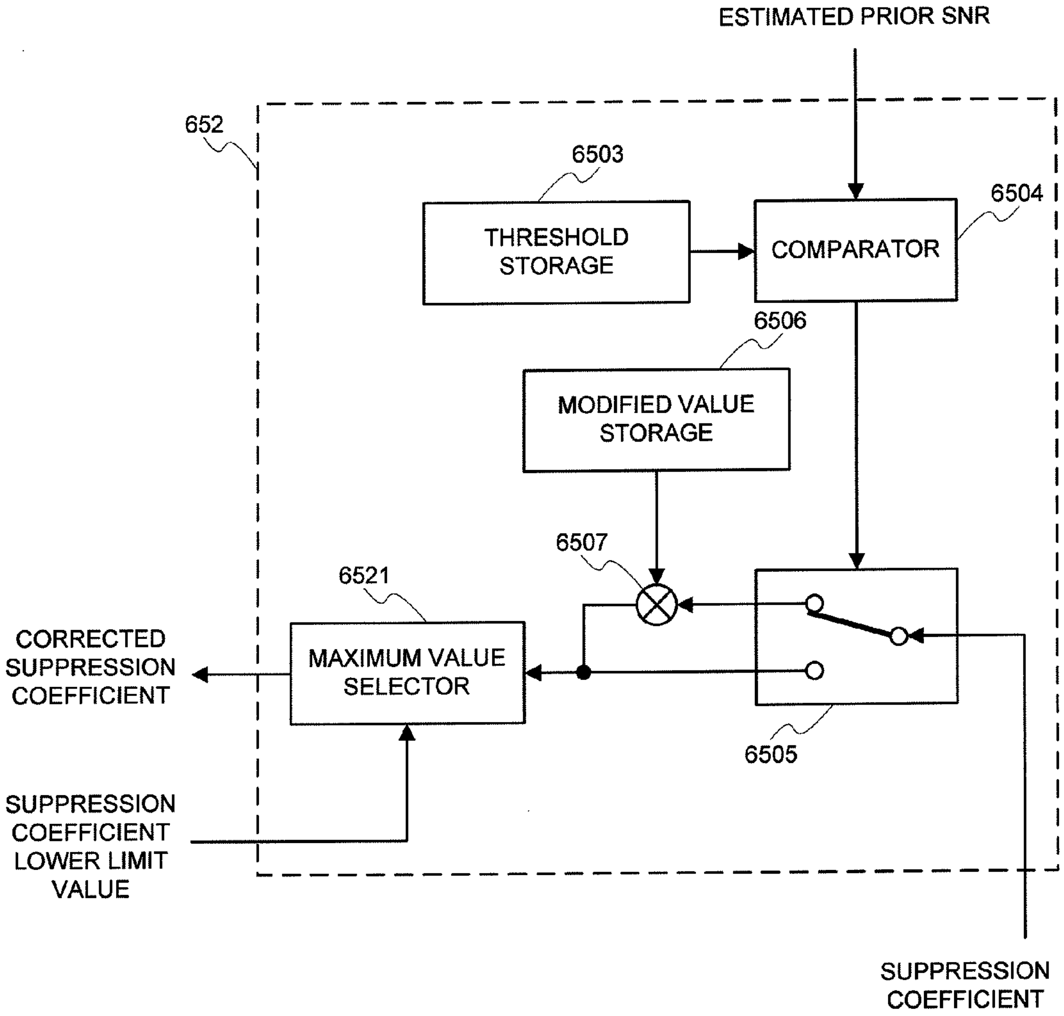
FIG. 20 is a block diagram showing a configuration of a suppression coefficient corrector included in FIG. 19.

FIG. 20 shows an exemplary configuration of the suppression coefficient corrector 652. A difference thereof from FIG. 14 showing the exemplary configuration of the suppression coefficient corrector 650 is that the suppression coefficient lower limit value storage 6502 and maximum value selector 6501 are replaced with a maximum value selector 6521, to which the suppression coefficient lower limit value is supplied. That is, the maximum value selector 6521 uses the supplied suppression coefficient lower limit value in place of the suppression coefficient lower limit value stored in the suppression coefficient lower limit value storage 6502, to make selection of a maximum value from the suppression coefficient lower limit value and calculated suppression coefficient.

Figure 21:
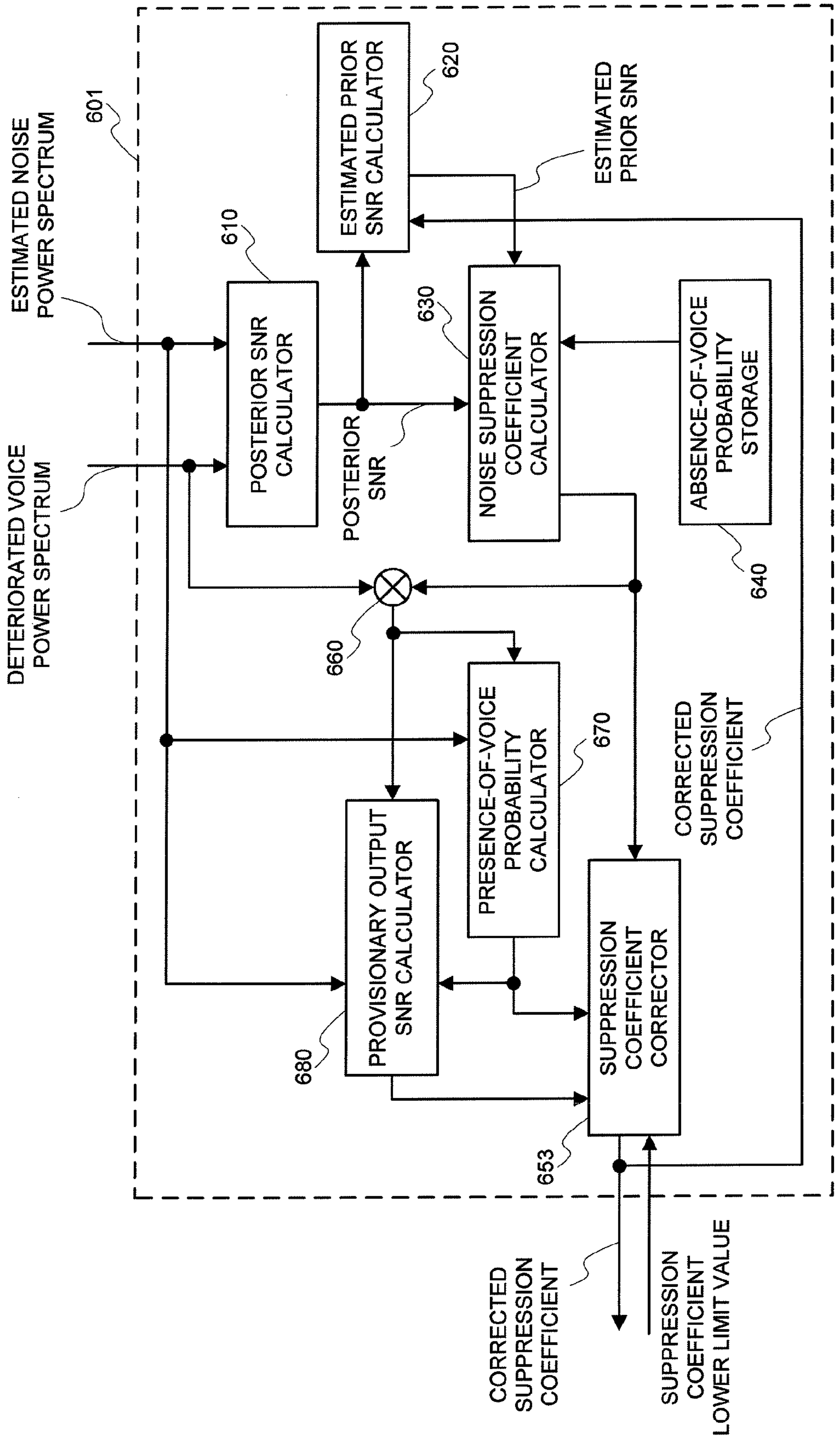
FIG. 21 is a block diagram showing a second configuration of a suppression coefficient generator included in FIG. 18.

FIG. 21 shows a second exemplary configuration of the noise suppression coefficient generator 601. A difference thereof from FIG. 15 showing the second exemplary configuration of the noise suppression coefficient generator 600 is that the suppression coefficient corrector 651 is replaced with a suppression coefficient corrector 653, to which the suppression coefficient lower limit value is supplied. The suppression coefficient corrector 653 uses the estimated prior SNR, noise suppression coefficient, and suppression coefficient lower limit value to correct the noise suppression coefficient, and outputs the corrected suppression coefficient.

Figure 22:
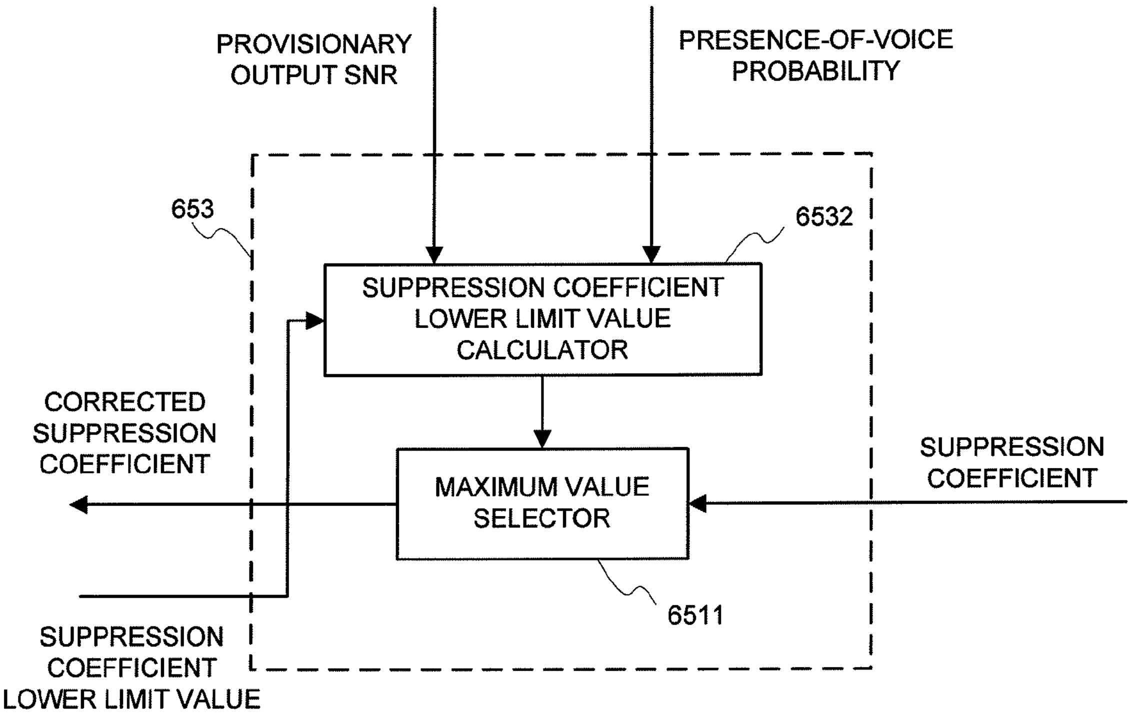
FIG. 22 is a block diagram showing a configuration of a suppression coefficient corrector included in FIG. 21.

FIG. 22 shows an exemplary configuration of the suppression coefficient corrector 653. A difference thereof from FIG. 16 showing the exemplary configuration of the suppression coefficient corrector 651 is that the suppression coefficient lower limit value calculator 6512 is replaced with a suppression coefficient lower limit value calculator 6532, to which the suppression coefficient lower limit value is supplied. That is, the suppression coefficient lower limit value calculator 6532 uses the supplied suppression coefficient lower limit value as well to calculate a suppression coefficient lower limit value. One specific calculation method involves placing a higher priority on the supplied suppression coefficient lower limit value over the suppression coefficient lower limit value calculated based on the provisionary output SNR and presence-of-voice probability. Audio quality can be appropriately controlled to suit user's preferences. Moreover, the supplied lower limit value may be given a higher priority only when the supplied lower limit value is larger than the calculated lower limit value. In this case, distortion in the output signal can be limited to a value corresponding to the supplied lower limit value. By applying a similar idea, a pair of lower limit values corresponding to voiced and non-voiced segments, or a pair of lower limit values corresponding to high and low SNR's, or a suppression coefficient itself may be supplied from the external. It will be easily recognized that such extensions may be applied to the exemplary configuration in FIG. 20.

Figure 23:
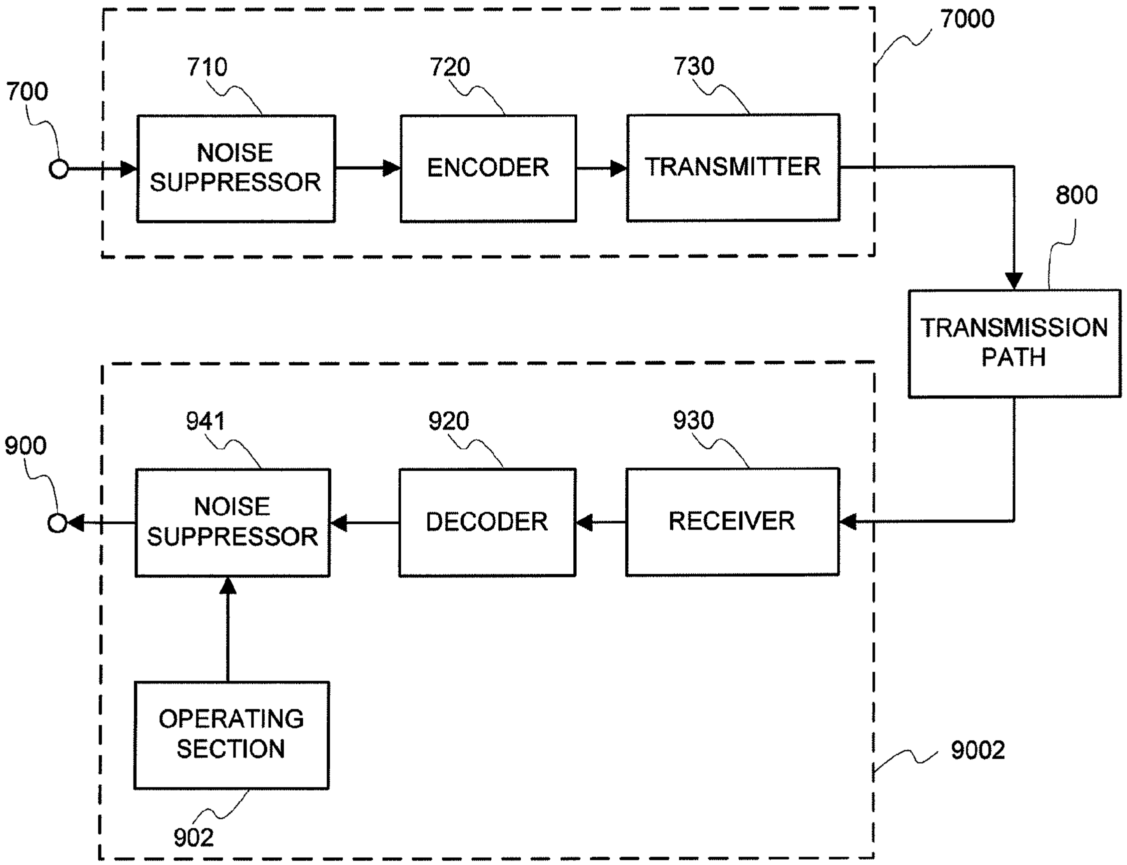
FIG. 23 is a block diagram showing a third mode for carrying out the present invention.

FIG. 23 is a block diagram showing a third mode for carrying out the present invention. FIG. 23 is different from FIG. 17 showing the second mode for carrying out the present invention in that the receiver terminal 9002 comprises an operating section 902 for supplying information input to the noise suppressor 941. To the noise suppressor 941 is transferred a signal containing information for controlling the degree of suppression made by the noise suppressor 941 from the operating section 902. Such information for controlling the degree of suppression include a suppression coefficient, its lower limit value or the like.

Figure 24:
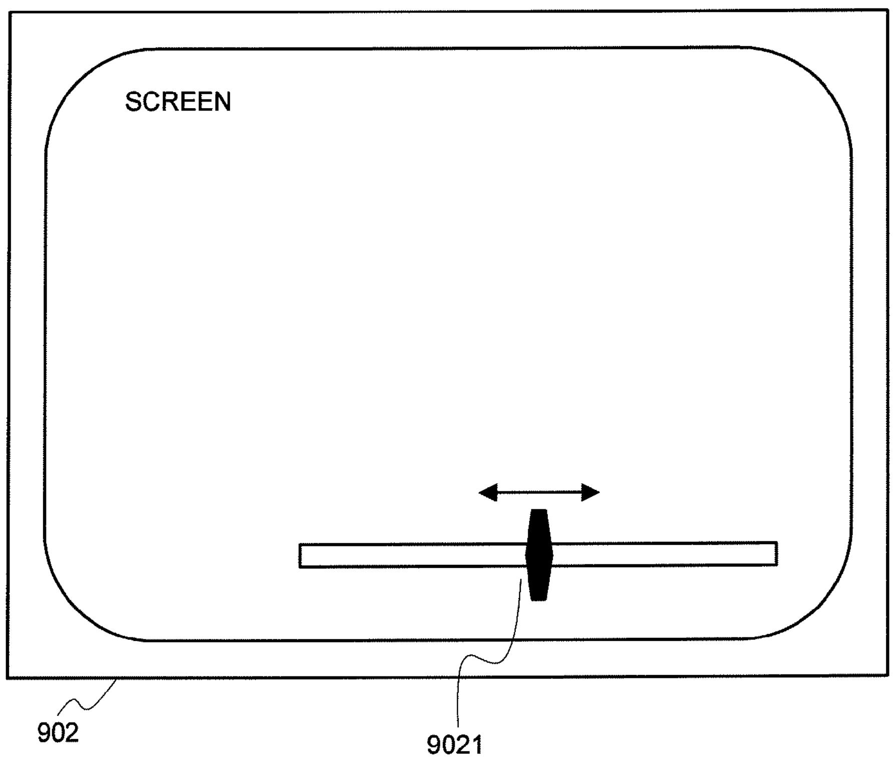
FIG. 24 is a block diagram showing a configuration of an operating section included in FIG. 23.

FIG. 24 shows an exemplary configuration of the operating section 902. The operating section 902 comprises at least a screen, on which a slider 9021 is displayed. By horizontally moving the slider 9021 through an operation of a mouse, a keyboard or a touch screen, a value of the signal supplied to the noise suppressor 941 can be adjusted via the operating section 902. It should be noted that the movement direction of the slider is not limited to a horizontal direction but it may be vertical, oblique, or any other arbitrary direction. A value determined by the operation of the slider 9021 is used as described regarding the second mode for carrying out the present invention.

Figure 25:
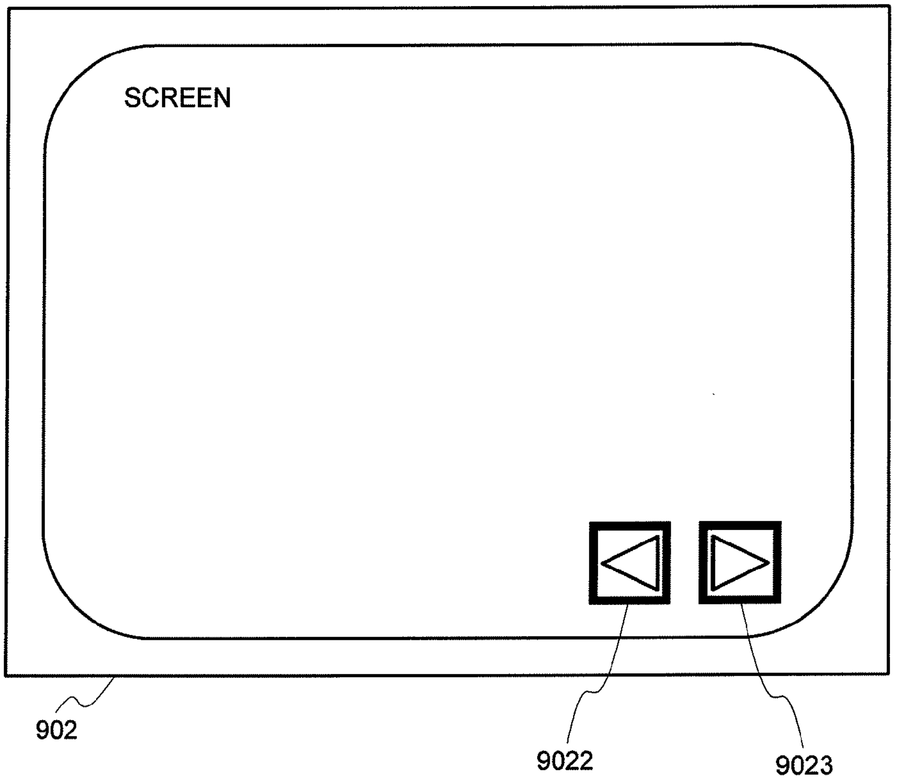
FIG. 25 is a block diagram showing a second configuration of an operating section included in FIG. 23.

FIG. 25 shows a second exemplary configuration of the operating section 902. A difference thereof from the first exemplary configuration is that a leftward button 9022 and a rightward button 9023 are provided in place of the slider 9021. By activating the leftward button 9022 and rightward button 9023 through an operation of a mouse, a keyboard or a touch screen, a value of the signal supplied to the noise suppressor 941 can be adjusted via the operating section 902. It should be noted that the direction of the buttons is not limited to a horizontal direction but it may be vertical, oblique, or any other arbitrary direction. A value determined by the operation of the buttons is used as described regarding the second mode for carrying out the present invention.

Figure 26:
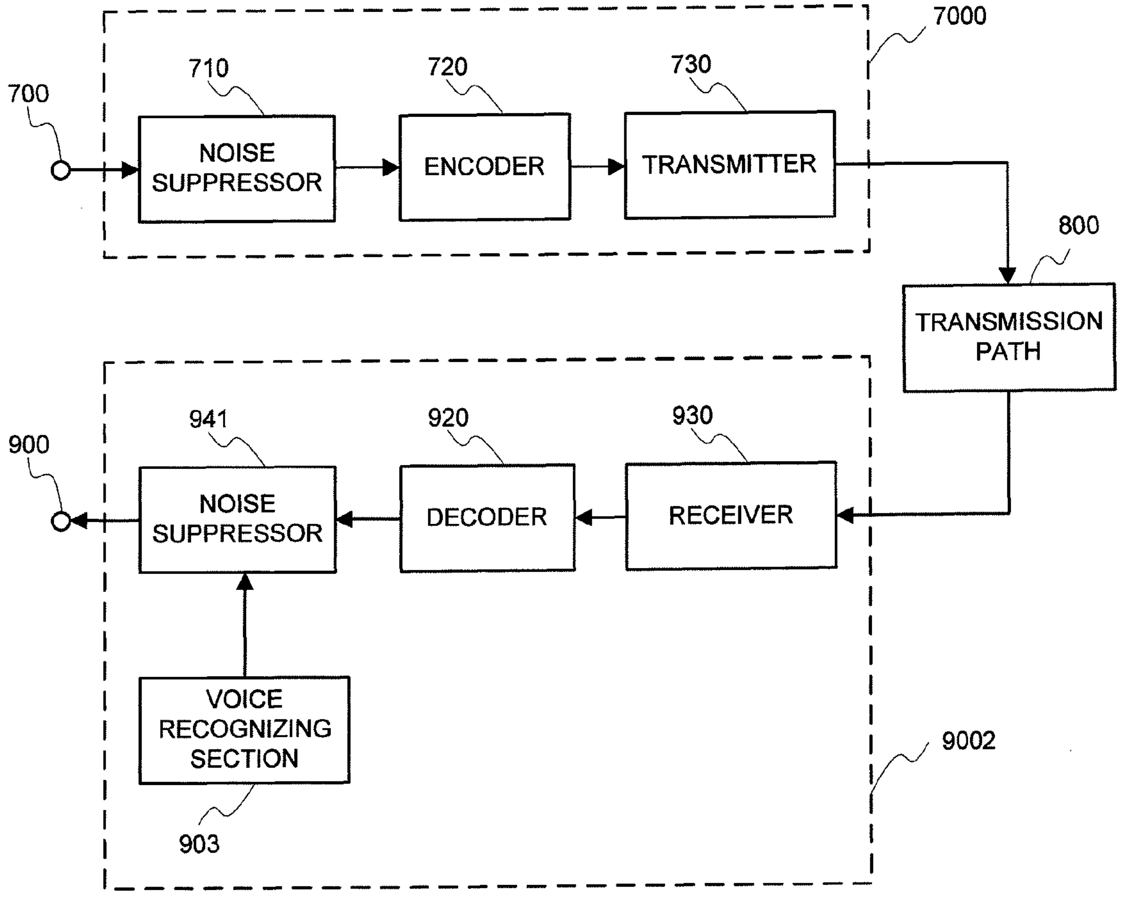
FIG. 26 is a block diagram showing a fourth mode for carrying out the present invention.

FIG. 26 is a block diagram showing a fourth mode for carrying out the present invention. FIG. 26 is different from FIG. 23 showing the third mode for carrying out the present invention in that the receiver terminal 9002 comprises a voice recognizing section 903 in place of the operating section 902. To the noise suppressor 941 is transferred a signal containing information for controlling the degree of suppression made by the noise suppressor 941 via the voice recognizing section 903. The information is caught by the voice recognizing section 903 recognizing a command spoken to a microphone provided in the voice recognizing section. The operation thereafter is similar to that in the third mode for carrying out the present invention, and description thereof will be omitted.

Figure 27:
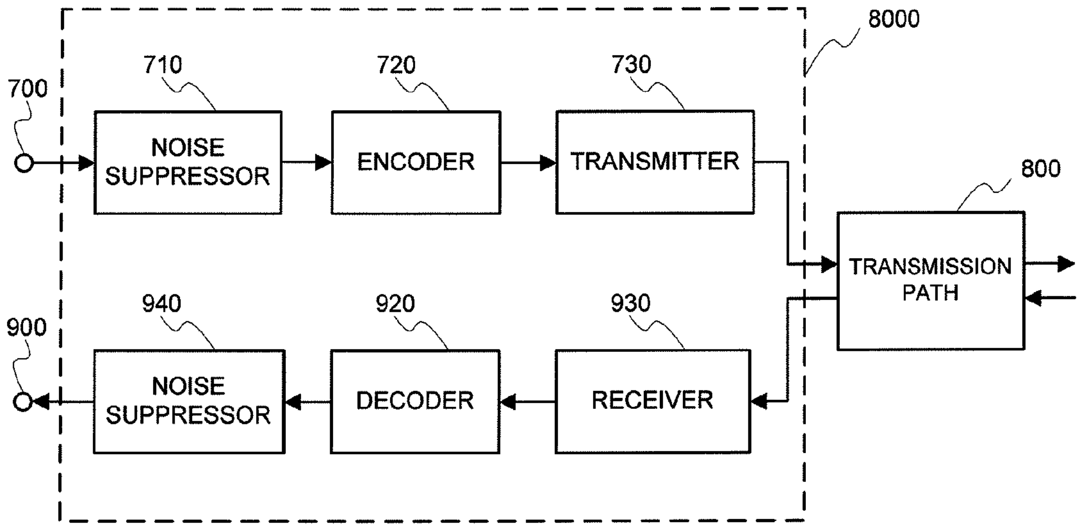
FIG. 27 is a block diagram showing a fifth mode for carrying out the present invention.

FIG. 27 is a block diagram showing a fifth mode for carrying out the present invention. Unlike FIG. 1 showing the best mode for carrying out the present invention, a transceiver terminal 8000 shown in FIG. 27 is configured for transmission/reception. A transmission signal output from the transmitter 730 is connected to a receiver of the communication partner via the transmission path 800. Likewise, a transmitter of the communication partner is connected to the receiver 930 via the transmission path 800. The operation of the other components is as described regarding the best mode for carrying out the present invention. Thus, it will be easily understood that the configuration may be implemented comprising a transceiver terminal in place of separate receiver and transmitter terminals in the second to fourth modes for carrying out the present invention. Moreover, the operating section 902 or voice recognizing section 903 may be configured to be external to the receiver terminal 9002.

Several modes for carrying out the present invention have been described with reference to the accompanying drawings. In all of the modes for carrying out the present invention, noise suppression is made in the receiver terminals 9001, 9002, and therefore, it is possible to implement a configuration in which no noise suppressor 710 is present in the transmitter terminal 7000. Moreover, it is possible to implement a form comprising a storage medium in place of the transmission path 800. In this case, the configuration usually includes no receiver 930.

Figure 28:
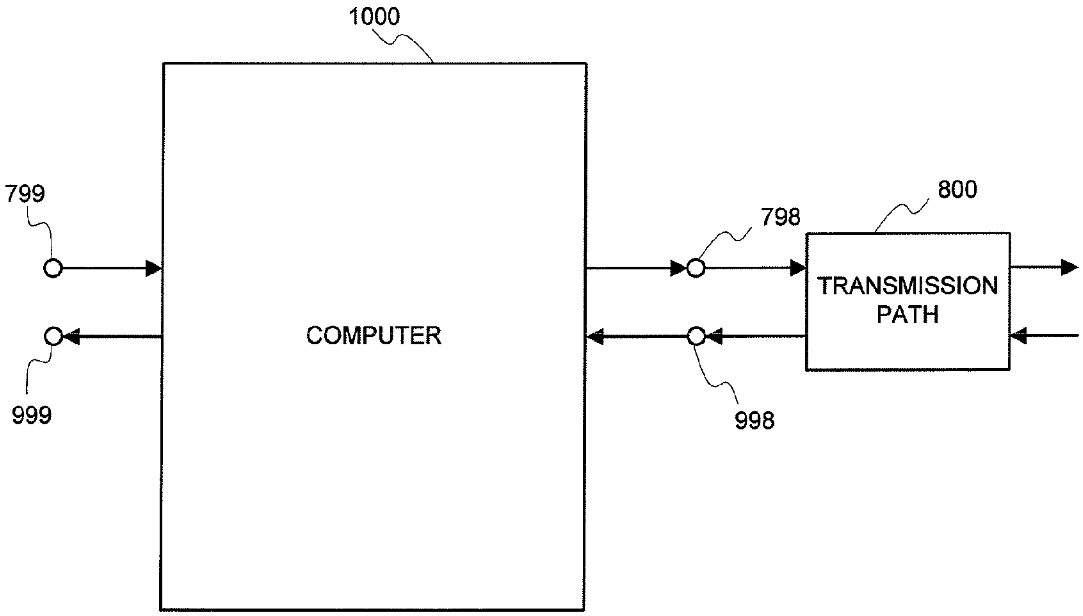
FIG. 28 is a block diagram showing a sixth mode for carrying out the present invention.

FIG. 28 is a block diagram of a signal processing apparatus based on a sixth mode for carrying out the present invention. The sixth mode for carrying out the present invention is comprised of a computer (central processing device; processor; data processing device) 1000 running under the program control, input terminals 799, 998, and output terminals 798, 999. The computer 1000 comprises the receiver 930, decoder 920, and noise suppressor 940. It is possible to implement a configuration comprising the noise suppressor 941 in place of the noise suppressor 940, or a configuration comprising no decoder 920 or receiver 930. A received signal supplied to the input terminal 998 is demodulated at the receiver 930 in the computer 1000, and a deteriorated voice composed of desired signal and noise is restored at the decoder 920. The deteriorated voice is processed at the noise suppressor 940 to enhance the desired signal. The computer 1000 may further comprise the encoder 720 and transmitter 730. At that time, the output signal of the transmitter 730 is sent to the transmission path 800 via the output terminal 798. Moreover, a configuration may be implemented such that the background noise is suppressed at the noise suppressor 710 before encoding at the encoder 720, to enhance the desired signal.

While in all the modes for carrying out the present invention described thus far, a minimum average square error short-term spectrum amplitude method is assumed as a scheme of noise suppression, the modes are applicable to other methods. Examples of such methods include: a Wiener filtering method as disclosed in Non-patent Document 4 (Non-patent Document 4: Proceedings of the IEEE, Vol. 67, No. 12, pp. 1586-1604, December, 1979), and a spectrum subtraction method as disclosed in Non-patent Document 5 (Non-patent Document 5: IEEE Transactions on Acoustics, Speech, and Signal Processing, Vol. 27, No. 2, pp. 113-120, April, 1979), detailed description of their exemplary configurations being however omitted.

Thus, according to the present invention, the noise is suppressed immediately before a received or reproduced signal is reproduced as an audible signal. Therefore, the noise contained in a signal generated by noise suppression processing at a transmitter having an inadequate function or CNG noise can be suppressed according to user's preferences.

Moreover, since information for adjusting the audio quality can be input, a user can adjust the audio quality according to the user's preferences.

While the invention has been particularly shown and described with reference to embodiments thereof, the invention is not limited to these embodiments. It will be understood by those of ordinary skill in the art that various changes in form and details may be made therein without departing from the spirit and scope of the present invention as defined by the claims.

What is claimed is:

1. A signal processing method for converting a signal received via a transmission path or read from a storage medium into a first audible signal, and suppressing a noise other than a desired signal contained in said first audible signal based on predetermined audio quality adjustment information, comprising steps of:

in suppressing a noise other than a desired signal contained in said first audible signal to generate an enhanced signal, receiving audio quality adjustment information for adjusting audio quality; and adjusting audio quality of said enhanced signal using said audio quality adjustment information, wherein said noise is suppressed by:

converting an input signal into a frequency-domain signal;

obtaining an estimated noise using said frequency-domain signal;

determining a suppression coefficient using said estimated noise and said frequency-domain signal;

correcting said suppression coefficient to obtain a corrected suppression coefficient so that distortion is reduced in a likely-to-be-voiced segment and a residual noise is reduced in a likely-to-be-non-voiced segment, said corrected suppression coefficient being obtained by:

obtaining a ratio of an average power in said likely-to-be-voiced segment to an average power in said likely-to-be-non-voiced segment; and obtaining said corrected suppression coefficient so that said residual noise in said likely-to-be-non-voiced segment is reduced when said ratio has a larger value; and weighting said frequency-domain signal with said corrected suppression coefficient.

2. A signal processing apparatus comprising:

a receiver for converting a signal received via a transmission path or read from a storage medium into a first audible signal; and a noise suppressor for suppressing a noise other than a desired signal contained in said first audible signal using predetermined audio quality adjustment information, wherein, in suppressing a noise other than a desired signal contained in said first audible signal to generate an enhanced signal, said noise suppressor receives audio quality adjustment information for adjusting audio quality, and adjusts audio quality of said enhanced signal using said audio quality adjustment information, wherein said noise suppressor comprises:

a converter for converting an input signal into a frequency-domain signal;

a noise estimator for estimating a noise using said frequency-domain signal;

a noise suppression coefficient generator for determining a suppression coefficient using said estimated noise and said frequency-domain signal;

a suppression coefficient corrector for obtaining a corrected suppression coefficient using said estimated noise, said frequency-domain signal and said suppression coefficient; and a multiplier for weighting said frequency-domain signal with said corrected suppression coefficient, and said suppression coefficient corrector corrects said suppression coefficient so that distortion is reduced in a likely-to-be-voiced segment and a residual noise is reduced in a likely-to-be-non-voiced segment, said suppression coefficient corrector obtaining a ratio of an average power in said likely-to-be-voiced segment to an average power in said likely-to-be-non-voiced segment, and corrects said suppression coefficient so that a residual noise in said likely-to-be-non-voiced segment is reduced when said ratio has a larger value.

* * * * *